(12) United States Patent
Brady et al.

(10) Patent No.: US 7,646,557 B2
(45) Date of Patent: Jan. 12, 2010

(54) METHODS AND APPARATUS FOR GENERATING A CLOCK SIGNAL, FOR WRITING SERVO TRACKS, AND FOR CHARACTERISING TIMING ERRORS IN A SERVO TRACK WRITER

(75) Inventors: Keith R. C. Brady, Fareham (GB); Gregory M. Quick, Hayling Island (GB); Paul H. R. Jolly, Fareham (GB); Paul A. Levin, Manhattan Beach, CA (US); Ian P. McGuire, Portchester (GB)

(73) Assignee: Xyratex Technology Limited, Havant, Hampshire (GB)

( * ) Notice: Subject to any disclaimer, the term of this patent is extended or adjusted under 35 U.S.C. 154(b) by 549 days.

(21) Appl. No.: 11/480,582

(22) Filed: Jul. 5, 2006

(65) Prior Publication Data

US 2007/0008643 A1    Jan. 11, 2007

Related U.S. Application Data

(60) Provisional application No. 60/695,845, filed on Jul. 5, 2005.

(51) Int. Cl.
    *G11B 5/09* (2006.01)
(52) U.S. Cl. ........................................... 360/51; 360/75
(58) Field of Classification Search ........................ None
    See application file for complete search history.

(56) References Cited

U.S. PATENT DOCUMENTS

| 5,535,067 A | 7/1996 | Rooke |
| 5,909,333 A | 6/1999 | Best et al. |
| 6,046,969 A * | 4/2000 | Towner et al. ............ 369/47.31 |
| 6,118,604 A * | 9/2000 | Duffy ........................... 360/48 |
| 6,172,830 B1 | 1/2001 | Leonard |
| 6,356,401 B1 | 3/2002 | Bates et al. |
| 6,414,807 B2 | 7/2002 | Bates et al. |
| 6,674,593 B2 | 1/2004 | Jolly et al. |
| 2004/0105184 A1* | 6/2004 | Harada et al. .................. 360/51 |
| 2004/0130817 A1 | 7/2004 | Fukushi et al. |

OTHER PUBLICATIONS

Yukihiro Uematsu and Masanori Fukushi, "Servo Track Writing Technology," Fujitsu Sci. Tech. J., vol. 37 ( No. 2), p. 220-226, (Dec. 5, 2001).
Nakayama et al., "Servotrack Writing System Using Dual Laser Scales for High Track-Per-Inch Recording," IEEE Transactions on Magnetics, vol. 40 ( No. 4), p. 3123-3126, (Jul. 4, 2004).

* cited by examiner

*Primary Examiner*—Jason C Olson
(74) *Attorney, Agent, or Firm*—Pillsbury Winthrop Shaw Pittman, LLP

(57) ABSTRACT

A method of generating a clock signal from a moving medium includes detecting movement of at least one mark that moves synchronously with the medium. A generally sinusoidal output signal corresponding to movement of the mark is produced. The generally sinusoidal output signal is interpolated to provide a clock signal having a higher frequency than said generally sinusoidal output signal. The interpolation dynamically adjusts the phase of the interpolated output clock signal to correct for errors in the phase of said output signal. In one embodiment, servo tracks are written to a magnetic disk using a servo pattern signal, the phase of the servo pattern signal being adjusted relative to a clock signal. In another aspect, timing errors in a servo track writer are characterised.

45 Claims, 14 Drawing Sheets

METHODS AND APPARATUS FOR GENERATING A CLOCK SIGNAL, FOR WRITING SERVO TRACKS, AND FOR CHARACTERISING TIMING ERRORS IN A SERVO TRACK WRITER

This application claims the benefit of priority to U.S. application Ser. No. 60/695,845, filed Jul. 5, 2005, the content of which is hereby incorporated by reference.

One aspect of the present invention relates to a method of and apparatus for generating a clock signal. Another aspect of the present invention relates to a method of and apparatus for writing servo tracks to a magnetic disk. Another aspect of the present invention relates to a method of and apparatus for characterising timing errors in a servo track writer.

Information for systems such as data processing systems is typically stored on storage media. Particular use is made of storage disks such as magnetic disks, opto-magnetic disks, and the like. One type of magnetic disk arrangement is a so-called "head disk assembly" which is intended normally to be permanently fixed in a data processing system; the head disk assembly includes one or more magnetic disks and the associated read and write head or heads (the "product" head or heads) which write data to the disk and read data from the disk. Another type of magnetic disk arrangement is of a type known as "removable media" which normally consists of a magnetic disk medium in a protective plastics case which can be used to transfer data between data processing systems by physical transfer of the disk itself from one machine to another.

In a known method of manufacturing storage media such as hard disk drives, a head disk assembly consisting of the product head(s), the disk or disks, the motor and arm electronics, is mounted in a mastering station known as a servo track writer. The servo track writer writes a pattern of magnetic information (the "servo pattern", which is made up of "servo bursts") onto the disk. The servo pattern becomes the master reference which is used by the disk drive during normal operation in order to locate the tracks and sectors on the disk for data storage and retrieval. Clearly, the servo bursts have to be accurately written to the disk at very well defined positions.

In order to be able to write the servo pattern onto the correct positions on the disk during manufacture of the disk, in one commonly used process, a (usually temporary) "clock track" is written onto the disk to serve as a timing reference during writing of the servo pattern. Conventionally, a separate clock head is used to write the clock track onto the disk and to read the clock track from the disk so that the servo bursts, which are written with the disk drive's product head, can be phase aligned with respect to the clock track and each other. However, the use of a dedicated clock track writing head is an expensive addition to the manufacturing process and further requires that the servo tracks be written in a clean room because the clock track writing head has to be inserted into the open (unsealed) head disk assembly. Moreover, in practice the clock heads have to be replaced frequently because of damage which occurs during use. A failure of a clock head during the servo track writing process also means that the tracks already written to the disk or other medium have to be erased and the process restarted for that disk or other medium, which is clearly wasteful of time. In addition, occasionally, the clock head can crash into the disk, thus causing damage to the disk surface.

As is known, a servo track writer may also be used during a head testing operation to lock the position of the head to the disk.

For both cost and performance benefits, there is a trend towards use of a so-called media level servo track writer or "media writer" to write the servo pattern to storage media, such as disks. The media writer writes the servo pattern to a disk prior to the disk being incorporated in a hard disk drive. The media writer thus has its own head having at least a write element for writing the servo pattern to the disk in place of the product write element that is used in the conventional servo track writing process described above. A media level writer typically has a gang of heads for writing to plural disks simultaneously, the disks being stacked and mounted on a rotating spindle of the media writer. Typically, one of the disks is written with a clock track by a clock head of the media writer. That clock track is read by the clock head to serve as a timing reference during writing of the servo patterns to the other disks. However, as with the more conventional process described above, the media writer clock head has to be replaced frequently owing to damage which occurs in use. Unless the context requires otherwise, the term "servo track writer" is used generically herein to include at least the conventional type that writes to one disk at a time and the media writer type.

There have been a number of proposals that avoid the use of a separate clock head in a servo track writing process. For example, a so-called self-servowriting system has been proposed. See for example WO-A-98/31015 and U.S. Pat. No. 6,172,830 in which there is disclosed a method and system for writing a clock track on a storage medium using an internal recording head of a hard disk drive.

Other arrangements are disclosed in for example U.S. Pat. No. 5,909,333, U.S. Pat. No. 6,414,807, U.S. Pat. No. 6,356,401, and the paper "Servo Track Writing Technology" by Uematsu and Fukushi in FUJITSU Sci. Tech. J., 37, 2, p 220-226 (December 2001). In these arrangements, no magnetic clock track as such is written to any disk. Instead, a grating or some other optically detectable scale is fixed to or formed on the disk or the spindle hub on which the disk is mounted or some other part that rotates with the disk during the servo track writing process. An optical detector detects the relative movement of the grating lines as the disk is rotated. Processing is carried out on the output of the optical detector in order to generate a clock signal which is then used to control the timing of the writing of the servo bursts to the disk. However, the processing techniques disclosed in these prior art arrangements do not provide sufficient accuracy, flexibility and/or control of the clock signal that is produced.

The present invention in one aspect is concerned mainly with servo track writers for writing servo bursts to a disk in which a detector detects the relative movement of lines past the detector as the disk is rotated during the servo track writing process in which the lines are fixed (as opposed to being practically freely written as a magnetic clock track as in the prior art discussed above). The preferred embodiment uses an optical detector to detect movement therepast of optically detectable features, such as lines of a grating. However, some aspects of the present invention can also be applied to servo track writers in which other types of rotary position sensors are used, such as a magnetic encoder that detects relative movement of fixed magnetic transitions to generate a timing signal. Moreover, some aspects of the present invention are more widely applicable, for example to optical rotary encoders in general and to characterising timing errors in a servo track writer.

Reference is made to U.S. Pat. No. 6,674,593 and WO-A-01/67453, the entire contents of which are hereby incorporated by reference. In these documents there are disclosed a number of techniques for writing servo bursts to a storage medium. In one particular arrangement, a servo pattern signal having a pattern frequency is generated from a reference signal by passing the reference signal to two amplifiers the outputs of which are separated or shifted in phase relative to each other and summing said outputs. The summed output is used to generate the servo pattern signal. A clock track is read from the storage medium to obtain a clock signal having a clock frequency. The phase of the servo pattern signal is adjusted relative to the clock signal so that the servo pattern signal is in phase with the clock signal by adjusting the gain of at least one of the amplifiers. A servo track is then written in accordance with the servo pattern signal to the storage medium. The phase by which the outputs of the amplifiers are separated or shifted relative to each other is preferably 90°.

According to a first aspect of the present invention, there is provided a method of generating a clock signal from a moving medium, the method comprising: detecting movement of at least one mark that moves synchronously with the medium; producing a generally sinusoidal output signal corresponding to movement of the mark; and, interpolating said generally sinusoidal output signal to provide a clock signal having a higher frequency than said generally sinusoidal output signal, the interpolation dynamically adjusting the phase of the interpolated output clock signal to correct for errors in the phase of said output signal.

The preferred embodiment provides for arbitrary positioning of clock timing marks by dynamic interpolation of a generally sinusoidal signal obtained from an output of a detector that detects movement of the at least one mark. In the main embodiment, the position of the mark or marks is fixed relative to the medium. Plural clock marks are generated between the normal zero-crossing points of said signal so that the clock signal that is output has a higher frequency than said signal. It should be noted that the output of the detector may have a relatively low frequency and thus can be interpolated more or less directly (save for some optional but preferred clean-up processing and the like as discussed further herein). Alternatively, the output of the detector may have a relatively high frequency, which is divided down in frequency prior to the interpolation. By operating on a generally sinusoidal signal, phase information can, in principle at least, be preserved.

In an embodiment, the interpolation step dynamically adjusts the phase of the interpolated output clock signal by detecting phase errors in the interpolated output clock signal and feeding back corrections into the interpolation step. This allows for practically continuous correction of phase error, on-the-fly, by feeding back corrections into the interpolation. This in turn allows for a much higher quality interpolated clock signal, which is of paramount importance in the context of servo track writing which relies on having a high quality clock signal.

In an embodiment, the medium is rotating and the at least one mark rotates synchronously with the medium.

In an embodiment, the output signal comprises two components that are out of phase with each other, the interpolating including multiplying said components by variable amplitudes and summing the amplitude-multiplied components. It will be understood that the output signal may comprise more than two components.

In an embodiment, the variable amplitudes are varied at least to compensate for one or more non-repeatable timing errors that have previously been identified.

The detecting of the movement of the at least one mark is preferably carried out by a detector that outputs two analogue signals which are used as or to form said two components of the output signal. It will be understood that it is possible to use a detector that outputs more than two analogue signals which are used to form a corresponding number of components of the output signal.

Alternatively, the detecting of the movement of the at least one mark may be carried out by a detector that outputs a single signal that is used to form said two components of the output signal. The two components may be obtained by taking a single analogue sinusoidal signal obtained directly from a detector as the first component and generating the second component from the first component. Alternatively, the two components may be obtained by taking a single digital signal obtained directly from a detector, producing an analogue sinusoidal signal as the first component from the digital signal, and generating the second component from the first component.

In an embodiment, said two components of the output signal are exactly or substantially 90° apart in phase, the method comprising multiplying one of the components by $\sin(P_1)$ and multiplying the other of the components by $\cos(P_2)$ where $P_1$ and $P_2$ are variable phase angles that are varied at least according to the frequency required of the clock signal. $P_1$ and $P_2$ are preferably varied to correct for errors in the phase of said output signal. This provides a relatively straightforward way of enabling the clock timing marks to be dynamically interpolated. At any time instant, $P_1$ and $P_2$ (nominally at least) have the same value.

In this embodiment, the medium may be a storage medium rotating at a rotational frequency which is obtained from a reference signal having a reference frequency; a servo pattern signal having a pattern frequency is obtained from said reference signal; the phase of the servo pattern signal is adjusted relative to the clock signal so that the servo pattern signal is in phase with the clock signal; and, a servo track in accordance with the servo pattern signal is written to the storage medium; and the method may comprise: monitoring the phase adjustments made to the servo pattern signal; and, setting values for $P_1$ and $P_2$ in accordance with the monitored phase adjustments made to the servo pattern signal. This embodiment uses the phase adjustments that are made to the servo pattern signal in practice in a servo track writer during a servo track writing process to correct for timing errors in the clock signal, including particularly repeatable timing errors arising from for example an eccentric mounting of the mark or marks relative to the rotating storage medium and from imperfections in the grating or the like that provides the mark or marks. This means that these errors can be corrected by use of apparatus already present in the servo track writer and thus avoids the need for any additional apparatus solely for correcting these timing errors. Again, at any time instant, $P_1$ and $P_2$ (nominally at least) have the same value.

In an embodiment, the medium is a storage medium rotating at a rotational frequency which is obtained from a reference signal having a reference frequency; a servo pattern signal having a pattern frequency is obtained from said reference signal; the phase of the servo pattern signal is adjusted relative to the clock signal so that the servo pattern signal is in phase with the clock signal; and, a servo track in accordance with the servo pattern signal is written to the storage medium; and the method comprises: monitoring the phase adjustments made to the servo pattern signal; and, adjusting the phase of the generated clock signal in accordance with the phase adjustments made to the servo pattern signal thereby to correct for errors in the phase of said output signal. Again, this embodiment uses the phase adjustments that are made to the servo pattern signal in practice in a servo track writer during a servo track writing process to correct for timing errors in the clock signal, including particularly repeatable timing errors arising from for example an eccentric mounting of the mark or marks relative to the rotating storage medium and from imperfections in the grating or the like that provides the mark or marks. Again, this means that these errors can be corrected by use of apparatus already present in the servo track writer and thus avoids the need for any additional apparatus solely for correcting these timing errors.

In a most preferred embodiment, the servo pattern signal is obtained by passing the reference signal to two amplifiers the outputs of which are separated or shifted in phase relative to each other and summing said outputs, the phase of said servo pattern signal being adjusted by adjusting the gain of at least one of the amplifiers. This embodiment uses a so-called vector modulator which is present in some existing servo track writers for adjusting the phase of the servo pattern signal.

In an embodiment, the clock signal is obtained after passing the signal generated from the interpolation to a phase locked loop having a phase error detector the output of which is used to provide a control signal to a voltage controlled oscillator of the phase locked loop, and the method comprises: monitoring variations in the control signal provided to said voltage controlled oscillator; and, setting values for $P_1$ and $P_2$ in accordance with the monitored variations. In this embodiment, a PLL acts as a tracking filter and the PLL is used to determine the adjustments that need to be made to the clock signal in order to correct for timing errors.

In an embodiment, the clock signal is obtained after passing the signal generated from the interpolation to a phase locked loop having a phase error detector the output of which is used to provide a control signal to a voltage controlled oscillator of the phase locked loop, and the method comprises: monitoring variations in the control signal provided to said voltage controlled oscillator; and, adjusting the phase of the generated clock signal in accordance with the variations in the control signal provided to said voltage controlled oscillator thereby to correct for errors in the phase of said output signal. Again, in this embodiment, a PLL acts as a tracking filter and the PLL is used to determine the adjustments that need to be made to the clock signal in order to correct for timing errors.

In an embodiment, the method comprises applying a selective phase delay to repeatable timing error data obtained by the step of monitoring variations in the control signal provided to said voltage controlled oscillator, thereby to correct for errors that can arise through operation of said phase locked loop.

In an embodiment, the generally sinusoidal output signal corresponding to movement of the mark is processed prior to the interpolating by: passing the output signal of the detecting step as a first input to a phase error detector of a phase locked loop and passing as a second input to the phase error detector the output or divided output of a voltage controlled oscillator of the phase locked loop; and, using the output of the voltage controlled oscillator as the output signal that is used in the interpolating step. Such so-called front end processing enables a number of advantages, depending on the precise implementation, including improved bandwidth characteristics, leading to a better signal-to-noise ratio, and better preservation of phase information in the output from the detector.

In this embodiment, the method may comprise: passing the output signal of the detecting step as a first input to a frequency discriminator; passing as a second input to the frequency discriminator the output or divided output of the voltage controlled oscillator of the phase locked loop; selectively applying the outputs of the frequency discriminator to the inputs of an operational amplifier of the phase locked loop so as to inject current pulses into the operational amplifier to indicate the direction of change of frequency required of the voltage controlled oscillator.

In an embodiment, the output from the voltage controlled oscillator is passed to a sine function look-up table and to a cosine function look-up table, the outputs of the sine function look-up table and the cosine function look-up table providing a two-component output signal in which the two components are exactly or substantially 90° apart in phase. This allows generation of quadrature signals from single signal in which the two signals are in almost perfect quadrature.

In a preferred embodiment, the at least one mark is detected optically.

In an embodiment, the interpolation is carried out by at least two interpolators that operate on an interleaved basis such that as one of the interpolators is carrying out interpolation, the or another of the interpolators can update and settle. This allows simpler and less expensive interpolators to be used.

The present invention also provides a method of writing servo tracks to a magnetic disk using a servo pattern signal, the phase of the servo pattern signal being adjusted relative to a clock signal generated as described above so that the servo pattern signal is in phase with the clock signal.

According to a second aspect of the present invention, there is provided a method of characterising timing errors in a servo track writer in which, during a servo track writing process, a storage medium rotates at a rotational frequency which is obtained from a reference signal having a reference frequency; a servo pattern signal having a pattern frequency is obtained from said reference signal; the phase of the servo pattern signal is adjusted relative to a clock signal so that the servo pattern signal is in phase with the clock signal; and, a servo track in accordance with the servo pattern signal is written to the storage medium; the method comprising: recording at least some of the phase adjustments made to the servo pattern signal prior to and/or during a servo track writing process; and, determining timing errors arising in the servo track writer prior to and/or during the servo track writing process from said recorded phase adjustments.

The servo pattern signal is preferably obtained by passing the reference signal to two amplifiers the outputs of which are separated or shifted in phase relative to each other and summing said outputs, the phase of said servo pattern signal being adjusted by adjusting the gain of at least one of the amplifiers.

This aspect can be used during testing and characterising of a servo track writer. In particular, by taking relatively long averaging periods, measurements of the timing error can be made. This technique can then be used to characterise variations in the speed of the motor of the servo track writer, or defects in the gratings or other marks, or the like. In this respect, it may be helpful to analyse the error signals in the frequency domain to help identify the cause of the individual errors.

According to a third aspect of the present invention, there is provided apparatus for generating a clock signal from a moving medium, the apparatus comprising: a detector for detecting movement of at least one mark that moves synchronously with the medium to allow a generally sinusoidal output signal corresponding to movement of the mark to be produced; and, an interpolator for interpolating said generally sinusoidal output signal to provide a clock signal having a higher frequency than said generally sinusoidal output signal, the interpolator being arranged to dynamically adjust the phase of the interpolated output clock signal to correct for errors in the phase of said output signal.

The present invention also provides a servo track writer for writing servo tracks to a magnetic disk using a servo pattern signal, the servo track writer comprising: apparatus as described above for generating a clock signal from a moving medium; a servo pattern signal generator for generating a said servo pattern signal; and, a phase adjuster for adjusting the phase of a said servo pattern signal relative to a said clock signal so that the servo pattern signal is in phase with the clock signal.

According to a fourth aspect of the present invention, there is provided apparatus for characterising timing errors in a servo track writer in which, during a servo track writing process, a storage medium rotates at a rotational frequency which is obtained from a reference signal having a reference frequency; a servo pattern signal having a pattern frequency is obtained from said reference signal; the phase of the servo pattern signal is adjusted relative to a clock signal so that the servo pattern signal is in phase with the clock signal; and, a servo track in accordance with the servo pattern signal is written to the storage medium; the apparatus comprising: a data recorder for recording at least some of the phase adjustments made to the servo pattern signal prior to and/or during a servo track writing process; and, a processor for determining timing errors arising in the servo track writer prior to and/or during the servo track writing process from said recorded phase adjustments.

Embodiments of the present invention will now be described by way of example with reference to the accompanying drawings, in which.

Figure 1:
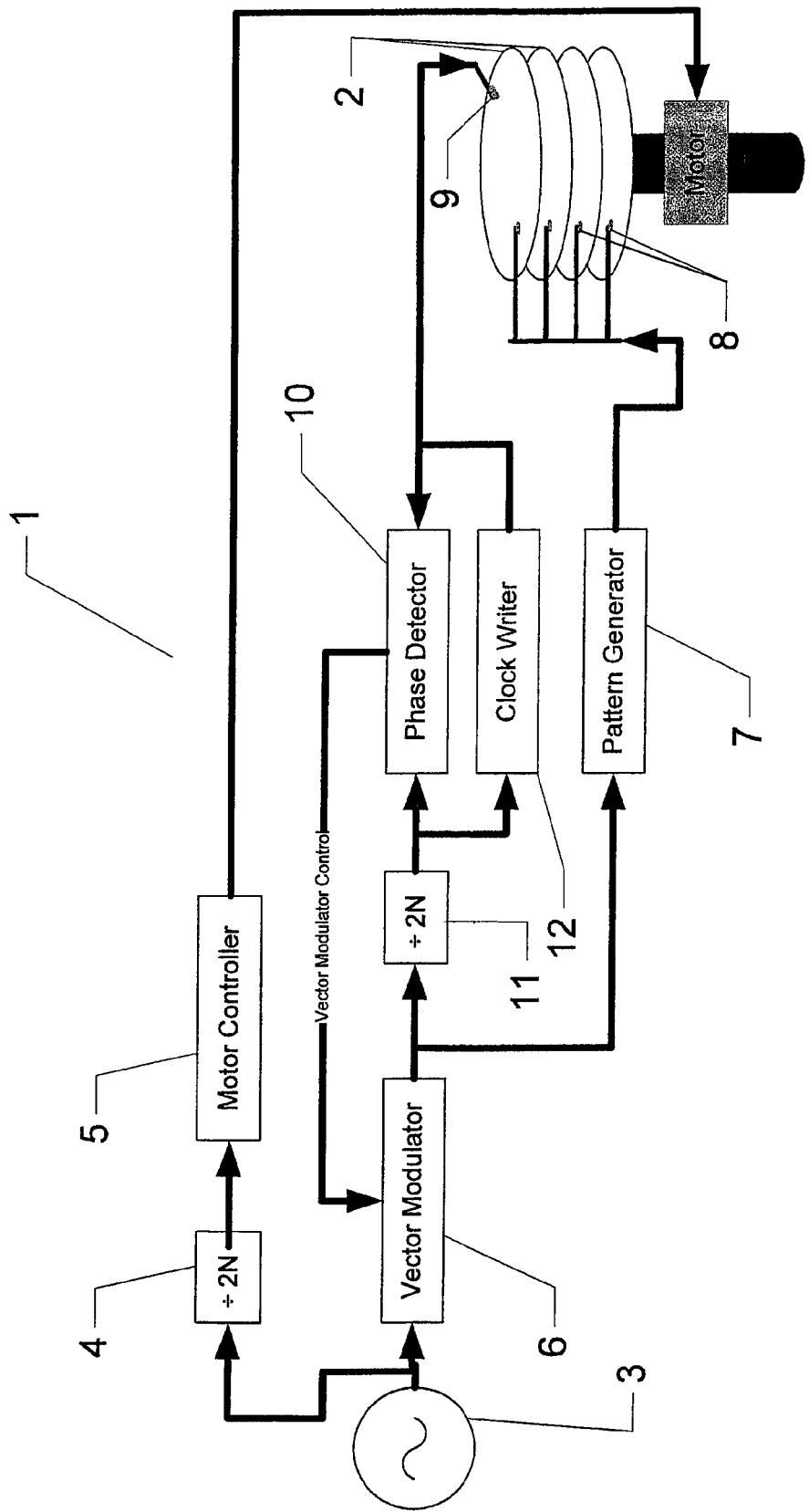
FIG. 1 shows a schematic block diagram of the main components of a prior art servo track writer.

Referring first to FIG. 1, there is shown a schematic block diagram of the main components of an existing servo track writer 1 for writing servo bursts to one or more rotating storage media 2 such as magnetic hard disks 2. The servo track writer 1 of FIG. 1 is generally of the type described more fully in U.S. Pat. No. 6,674,593 and WO-A-01/67453 mentioned above except that the example shown in FIG. 1 is of the media writer type. A crystal oscillator 3 or other master source provides a reference signal having a reference frequency from which all other frequencies in the servo track writer 1 are derived. A first divider 4 divides down the reference frequency to provide a motor frequency signal to a motor controller 5, which in turn is used to rotate the disks 2. The reference frequency from the source 3 is also passed via a phase adjuster 6 to a servo pattern generator 7, which generates the servo pattern to be written to the disks 2 via respective heads 8. As explained above, where the servo track writer 1 is of the media writer type, the heads 8 are heads of the servo track writer 1. On the other hand, in a conventional servo track writer 1 in which the whole hard disk assembly is loaded into the servo track writer 1, the head 8 is the product arm of the hard disk assembly.

Still referring to FIG. 1, in this prior art servo track writer 1, a clock track that has been written to one of the disks 2 is read back by a clock head 9 of the servo track writer 1. The read back clock signal is passed to a phase detector 10. An output of the phase adjuster 6 is passed via a second frequency divider 11 to a clock writer 12 which generates the clock signal which is written to said one disk 2. The divided down signal from the second frequency divider 11 is also passed to the phase detector 10. The phase detector 10 compares the phase of that divided-down frequency input with the phase of the clock track which is read back from said one disk 2 via the clock head 9. The result of this comparison is passed to the phase adjuster 6. In this manner, the signal that is passed to the servo pattern generator 7 is phase adjusted so as to ensure that the servo tracks that are written to the disks 2 are phase aligned with the clock track written to said one disk 2 and with each other.

A particular advantage of obtaining all frequency signals from a single master source 3 is that speed changes to the rotation of the disks 2, which in practice are necessary, can be obtained by changing the frequency of the output signal from the source 3; given that the source 3 is the source of all frequency signals in the servo track writer 1, the system as a whole will stay in phase lock even if such speed changes are made. Moreover, oscillators can be a source of error in such apparatus. Using a single master source 3 means that drifts in the frequency of the signal output by the source 3 do not affect any of the other aspects of the servo track writer 1.

As mentioned above, the use of a clock head 9 is inconvenient and there is a demand for a servo track writer that avoids the use of a clock head for writing and reading a magnetic clock track. As mentioned above, there are a number of proposals in the prior art that use a fixed grating or some other fixed detectable scale which rotates synchronously with the disk. For example, an optical detector detects the relative movement of the grating lines as the disk is rotated and a clock signal generated.

Figure 2:
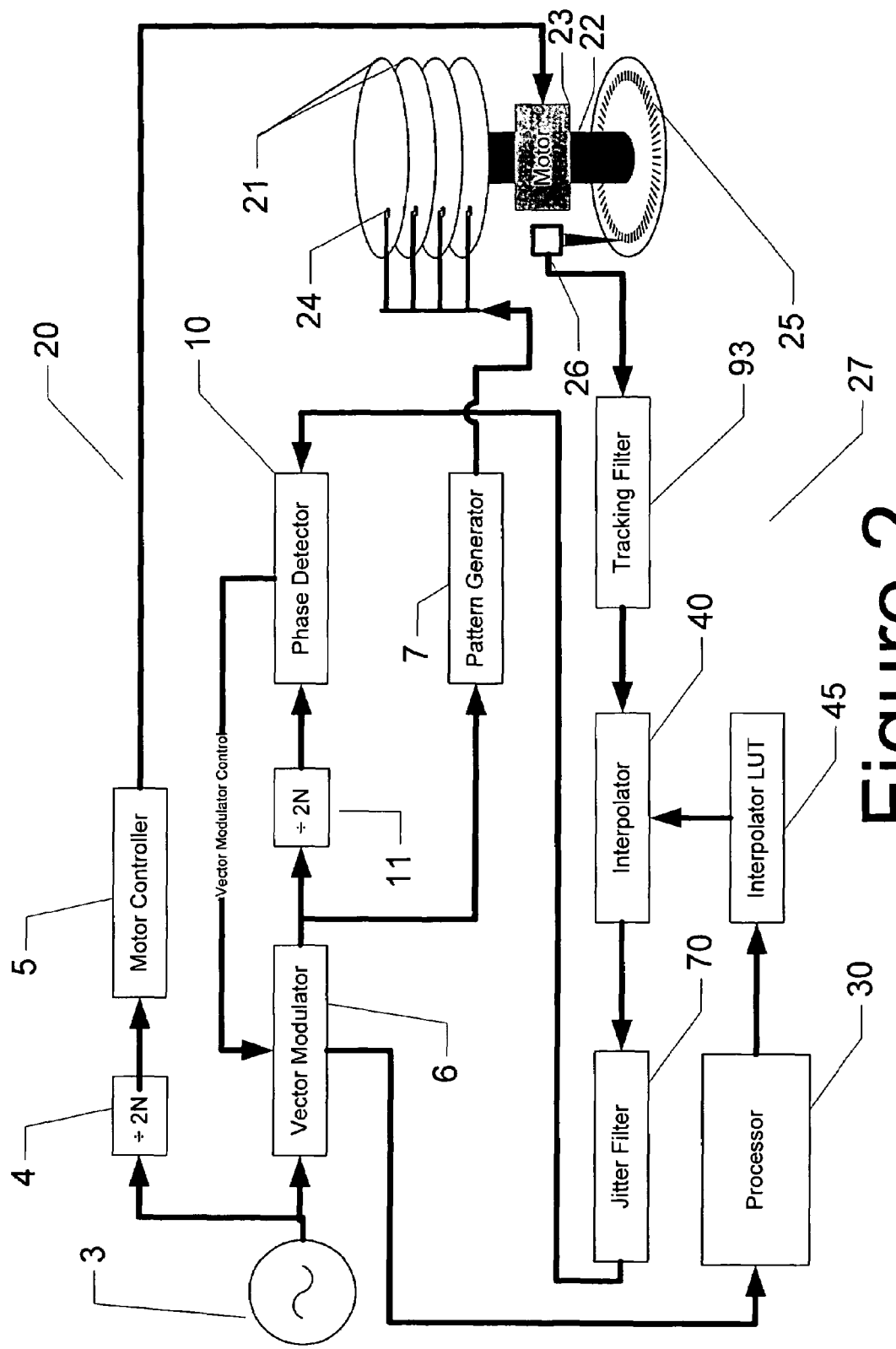
FIG. 2 shows schematically an example of a servo track writer in accordance with an embodiment of the present invention.

Referring now to FIG. 2, there is shown schematically an example of a servo track writer 20 in accordance with an embodiment of the present invention. Features that are the same as for the prior art example shown in FIG. 1 generally have the same reference numerals. The particular servo track writer 20 shown in FIG. 2 is again of the media writer type in which plural disks 21 are assembled in a stack on a spindle 22 of a motor 23. A gang of read/write heads 24 are offered up in use to the disks 21 to write the servo bursts to the individual disks 21. The servo track writer 20 in FIG. 2 uses an optical detector to detect movement therepast of grating lines as the disks 21 are rotated by the motor 23. Because no clock track is written to any of the disks 21 in this embodiment, there is no clock writer generator (12) as in the prior art of FIG. 1.

In FIG. 2, one location for the optical detector and grating lines is shown by way of example. In particular, a grating 25 is fixed to a rotating part at the back of the motor 23. A corresponding optical detector 26 is positioned adjacent the grating 25. In one example, this grating 25 has a little over 4000 lines around a revolution and in another example the grating disk carries almost 1 million lines around a revolution. In principle any reasonable number of lines may be used.

Other positions for the grating lines are possible. For example, the grating may be provided on a separate disk which is fixed rigidly and preferably permanently to the motor spindle 22 on which the magnetic disks 21 are mounted. As another example, in the Fujitsu paper mentioned above, a grating is fixed to one of the magnetic disks 21. A further alternative location is on the spindle 22 itself. Moreover, as mentioned above, other arrangements are possible, including other types of rotary position sensors, such as a magnetic encoder that detects relative movement of fixed magnetic transitions to generate a timing signal. In the present context, it is merely required that the grating lines or other marks move synchronously with the rotation of the disks 21 and it is notable that the grating lines or other marks are fixed and not variable in position relative to the disks 21.

The output from the optical detector 26 is passed to processing electronics, indicated generally by reference numeral 27 in FIG. 2, where processing of the output is carried out. Details of examples of the processing and the processing electronics 27 will be described further below. An output signal generated by the processing electronics 27, which in this embodiment effectively provides the clock signal for the servo track writing process, is passed to a phase detector 10 (which may be a phase locked loop). The comparison output of the phase detector 10 is passed as a control signal to the phase adjuster 6. The other input to the phase detector 10 is a divided-down signal from the phase adjuster 6. The phase detector 10 can therefore compare the phase of the clock signal which is output by the processing electronics 27 with the phase of the divided-down signal from the phase adjuster 6 and thus control the phase adjuster 6. The output of the phase adjuster 6 is also passed to the servo pattern generator 7. In this way, the signal that is passed to the servo pattern generator 7 by the phase adjuster 6 is phase adjusted so as to ensure that the servo tracks that are written to the disks 2 are phase aligned with the clock track that is ultimately obtained from the grating 25 and with each other.

Whilst the use of a grating 25 and optical detector 26 or other analogous arrangement is desirable, this approach nevertheless brings its own difficulties. For example, the number of grating lines is fixed and defined when the grating is etched or otherwise formed. On the other hand, the servo pattern generator 7 relies on the ability to configure the number of so-called clock detected bits around the revolution of the disk 21 to be an integer divisor of the number of magnetic transition states of the servo tracks written by the servo track writer 20. Moreover, low to medium cost optical encoders may only have a few thousand lines per revolution. On the other hand, for accurate writing of the servo bursts it is required to have some 50,000 to 100,000 clock detected bits per revolution. Moreover, given that the grating is mechanically fixed to a disk rather than being accurately written as a magnetic clock track to the disk, or given that the grating is provided elsewhere other than on a disk to which a servo track is being written, it is possible and indeed likely that the grating will be mounted eccentrically with respect to the centre of rotation of the disk. This eccentric mounting of the grating results in a so-called repeatable timing error, which is a generally sinusoidal timing error that can be very significant compared to timing variations due to other effects (such as variations in the crystal oscillator 3 and the speed of the motor 23). A repeatable timing error can also arise from imperfections in the grating itself, particularly in low cost gratings which are of course preferred for reasons of cost. Such an error if not corrected can propagate through the processing electronics to the servo pattern generator where the servo pattern to be written to the disks is generated. The same considerations apply in any arrangement where a timing signal is obtained by detecting movement of marks that are fixed relative to each other and/or a medium. The preferred embodiments of the present invention are intended to overcome one or more of these difficulties.

It is a fact that whilst most optical encoders ultimately provide a digital output with a pulse for each encoder line, internally they use an analogue detection arrangement. The analogue detector provides a sinusoidal wave form with one cycle per line. Moreover, many commercially available encoders also provide a second sinusoidal output which is shifted in phase by 90° relative to the first sinusoidal output.

Figure 3:
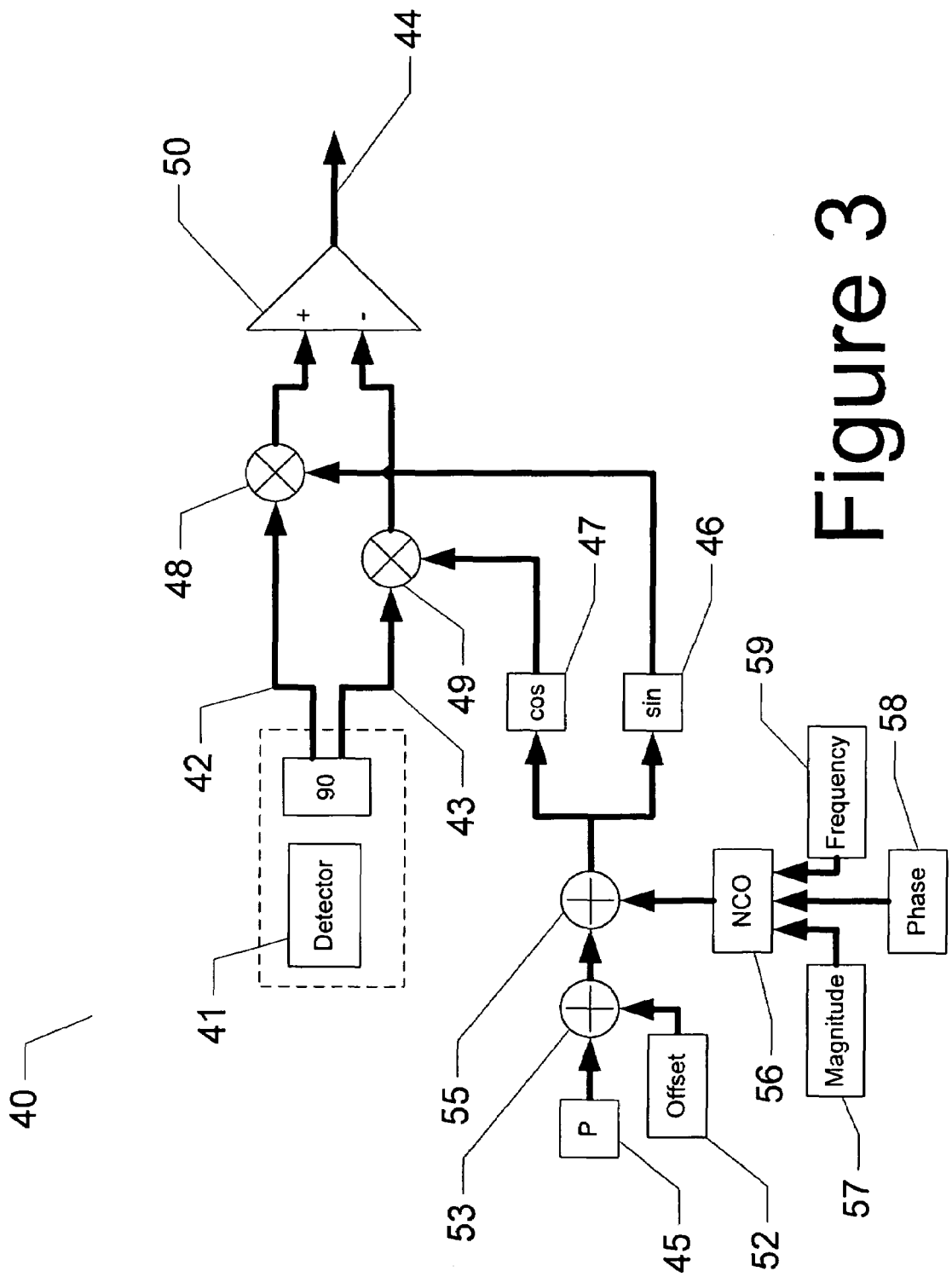
FIG. 3 shows a schematic block diagram of an example of an interpolation cell.

Reference is now made to FIG. 3 which shows schematically an example of an interpolation cell 40 which may be used as part of the processing electronics 27. In this drawing, there is shown an optical detector 41, which may correspond to the optical detector 26 mounted as discussed above or mounted elsewhere as mentioned above. Indeed, the detector 41 may be non-optical and may be for example a magnetic detector that detects movement therepast of fixed magnetic transitions that rotate synchronously with the disks 21.

Two sinusoidal output signals 42,43 which are 90° apart in phase are output by the detector 41. These output signals 42,43 may correspond to the two analogue quadrature output signals that can be obtained from some optical encoders as discussed above. Alternatively, the two output signals 42,43 may be obtained by processing of a single (digital or analogue) output signal from the optical detector 41; examples of arrangements for providing quadrature sinusoidal output signals from a single output signal from the detector 41 are discussed further below. It should be noted that in the case where there is a relatively large number of lines in the grating 25 around a revolution of the disks 21, it may be necessary or desirable to divide down in frequency the output signal from the detector 41. This allows basically the same "downstream" electronics to be used as for the case where there is a relatively small number of lines in the grating 25 around a revolution of the disks 21 and also allows the preferred flexible and dynamic interpolation process described herein to be applied.

The primary function of the interpolation cell 40 is to interpolate the relatively low frequency signals 42,43 so as ultimately to provide the high frequency clock signal which is required in the servo track writer 20. In one preferred embodiment, this is achieved by applying a phase shift to the output signals 42,43 by multiplying the output signals 42,43 by variable amplitudes in accordance with the following known mathematical relation:

$$\cos(P).\sin(\omega t)-\sin(P).\cos(\omega t)=\sin(\omega t-P)$$

where $\sin(\omega t)$ and $\cos(\omega t)$ are respectively the output signals 42,43 and P is a variable phase angle. By varying the phase angle P appropriately during the interpolation process, plural interpolation points or "timing marks" are created between the zero crossing points of the outputs 42,43. In other words, by using plural phase angles P, the output signal 44 is of higher frequency than the outputs 42,43 and can be used as the clock signal in the servo track writer 20. This is shown schematically in FIG. 4 which shows one of the outputs 42 (the other output 43 being omitted from the drawing for clarity) being interpolated using a phase angle P(t) that is controllably varied with time ultimately to produce a digital output signal 44 of higher frequency.

The values for P can be obtained from look-up tables stored in a memory 45. Preferably there is a separate entry in the look up tables 45 for each timing mark. The phase angles P are provided to respective sin and cos functions 46,47 provided by circuits known per se in the interpolation cell 40. The outputs from the sin and cos functions 46,47 are provided to respective mixers 48,49 where they are respectively multiplied by the output signals 42,43. The outputs from the mixers 48,49 are then subtracted in a comparator 50 to provide the clock signal 44.

A number of advantages follow from the arrangement shown in FIG. 3. First, by shifting in the phase domain rather than in the time domain, the interpolation points or timing marks will automatically track with the motor 23 as the motor 23 speeds up or down in use, which would not be possible if for example a fixed time delay were used to achieve the interpolation. In the preferred embodiment, which uses the analogue sinusoidal output signals 42,43 from the detector 41, all of the phase information available from the detector can be preserved and made available, in principle at least. In contrast, in for example U.S. Pat. No. 5,909,333, the output from the optical encoder (or "photo detector") is specifically converted to a square wave in a square wave generator, which in turn is then converted to quadrature saw tooth waves. In that prior art, therefore, most phase information from the photo detector is inevitably lost. Moreover, whilst the same phase angle P may be provided at any particular instant to both output signals 42,43, in general a different phase angle $P_1$ and $P_2$ can be applied at any time instant to the respective output signals 42,43. These different phase angles $P_1$ and $P_2$ for any time instant can be stored in separate look-up tables. This particular embodiment can more readily compensate for the case where the two output signals 42,43 are not precisely 90° apart in phase at any particular time instant, can compensate for the case where the output signals 42,43 are not perfect sine waves, and can compensate for repeatable timing errors, including the case where the grating is mounted eccentrically with respect to the centre of rotation of the disk. For convenience, unless it is necessary to distinguish herein between the different possible phase angles $P_1$ and $P_2$ at any time instant, reference will be made simply to the phase angle P at any time instant and it will be understood that different phase angles $P_1$ and $P_2$ may be applied to the two output signals 42,43 at any time instant.

Another advantage of using the interpolation cell 40 is that there will be no accumulating phase or frequency error which would have to be periodically reset, causing phase discontinuity in the clock detected bits seen by the pattern generator 7. These types of discontinuity normally require additional compensating hardware, such as a digital delay line. Moreover, once the interpolation cell 40 is properly configured, it does not require any further adjustment when small changes are made to the speed of the motor, as frequently happens in practice during the servo track writing process. Similarly, any correction that is made for the repeatable timing error, as discussed further below, remains the same following a change in the motor speed. In each case, this is because the interpolation process relies on the phase angle of the grating lines, which always remains the same as the grating lines are fixed in position relative to each other. In contrast, corrections for the repeatable timing error could be made in the time domain, but they would not be valid following a speed change.

The preferred mixers 48,49 are so-called multiplying digital-to-analogue converters (M-DACs).

In certain embodiments, a single interpolation cell 40 having a pair of M-DAC mixers 48,49 may be adequate. However, it may be that the analogue bandwidth of the M-DAC mixers 48,49 is not sufficient to support the rate of data flowing from the grating 25. It will be recalled that for example the grating 25 has about 4000 lines and it may be rotating at speeds of up to 20,000 rpm, requiring high effective bandwidth in the mixers 48,49. In such a case, as shown schematically in FIG. 5, plural interpolation cells 40 (three being shown in the drawing) may be interleaved. In the arrangement shown in FIG. 5, the outputs from the interleaved interpolation cells 40 are passed via respective leading edge pulse detectors 51 to a gate 52 from which the clock signal 44 is output. However, more preferably, the leading edge pulse detectors 51 are omitted and a multiplexer is used instead of the gate 52. In any event, through appropriate operation of flip-flops and gates as shown schematically in FIG. 5, at any particular time instant the output from only one interpolation cell 40 is used to provide the clock signal 44, whilst the or each other interpolation cell 40 is updating and settling. Operation then passes to the next appropriate interpolation cell 40, whilst the first interpolation cell 40 is itself updating and settling, and so on.

As has been mentioned, the phase angles P applied to the outputs 42,43 are stored in look-up tables 45, there being a separate entry in the look up tables 45 for each timing mark. These phase angles P at any particular time instant between the zero crossing points of the output signals 42,43 may be fixed. However, as mentioned above, it is preferred that the phase angles P be variable in order to compensate for timing errors in the output signals 42,43 and, most particularly, to compensate for repeatable timing errors including especially those that arise because the grating is mounted eccentrically with respect to the disk.

Now, in the prior art servo track writer described above, the phase of the servo pattern to be written to the disk is adjusted as necessary to compensate for phase or timing errors arising in the servo track writer, in turn to ensure that the servo tracks are perfectly written and phase aligned with each other. For example, referring to FIG. 1, the phase adjuster 6 adjusts the phase of the reference signal passing from the master source 3 to the pattern generator 7. In practice, in the prior art shown schematically in FIG. 1, the edge positions of the clock detected bits read back by the clock head 9 are compared in the phase detector 10 with the edge positions of the divided-down clock signal coming from the second frequency divider 11. (More advanced phase detectors 10 compare the energy content of the stream of clock detected bits with the energy content of the reference clock signal.) A decision is then taken at each clock detected bit whether to advance or retard the clock reference signal (and, in the advanced detector case, by how much). The result of this decision is passed to the phase adjuster 6 which adjusts the phase of the reference clock signal appropriately.

In the present servo track writers which use an optical detector and grating or similar detectable mark, as has been described above, the clock signal 44 is obtained in certain embodiments by interpolating the optical detector output signals 42,43 by use of the plural phase angles P. Again as mentioned above, it is preferred that the phase angles P stored in the look-up tables 45 be set so as to accommodate phase and/or timing errors, and particularly to compensate for repeatable timing errors arising in the servo track writer 20. To compensate for errors, such as a repeatable timing error, it is necessary to characterise the error. In one embodiment this is achieved by monitoring the phase adjustments made by the phase adjuster 6 of the servo track writer 20. The individual phase angles P to be applied at any time instant can then be set so as practically to eliminate any such errors, including especially the repeatable timing error.

For example, in one embodiment, the phase adjuster 6 may be of the so-called vector modulator type, which is described more fully in our U.S. Pat. No. 6,674,593 and WO-A-01/67453 mentioned above. As described in those documents, the reference signal passed to the vector modulator 6 from the oscillator 3 is adjusted in phase by changing the phase of the outputs of two amplifiers to which the reference signal is applied and summing those outputs. In simple mode, the phase adjustment made by the vector modulator 6 is of constant size. On the other hand, in proportional mode, the phase adjustments made by the vector modulator 6 are proportional to the size of the error detected by the phase detector 10.

In the context of the present servo track writer 20, the phase adjustments made by the phase adjuster 6 are recorded in a processor 30 (FIG. 2) for either all or a subset of the clock detected bits output as the output signal 44 around a revolution of the disks 21. This is carried out for a number of revolutions. Where the phase adjuster 6 is operating in simple mode in which the phase adjustments are all of the same size, this recording of the cumulative phase adjustments involves only addition or subtraction of a single value (such as one), which maximises the efficiency of data storage for this data. On the other hand, when running in proportional mode where the size of the phase adjustment is varied depending on the size of the error detected by the phase detector 10, the value added or subtracted during recordal of the cumulative phase adjustments has to be scaled to be proportional to the size of the phase adjustment.

Each element in the data set thereby obtained is then divided in the processor 30 by the number of revolutions over which it was captured in order to determine the mean phase movement at each clock detected bit. It should be noted that if the data is only collected for a subset of the clock detected bits, then it may be necessary to interpolate between those particular clock detected bits in order to generate the full data set. This can be done in a number of ways. For example, as a first order approximation, it may be assumed that a sinusoidal interpolation fit between the timing error of the clock detected bits is appropriate.

Having determined the mean phase movement at each clock detected bit, this data can be integrated in the processor 30 in order to determine the phase error that was being compensated for by the phase adjuster 6. Given that the size of the phase adjustment made at any particular time by the phase adjuster is known, this tracked phase error can be converted to a timing error. Having obtained the timing error, the individual phase angles P, which are calculated in the processor 30 and stored in the look-up tables 45, can be adjusted so that the positions of the clock detected bits effectively arising in the output signal 44 are moved equally and opposite the timing error that has been characterised, thereby practically eliminating these timing errors.

Thus, by appropriately recording the phase adjustments made during the normal servo track writing process by the phase adjuster 6, a measure of timing errors arising in the servo track writer 20 can be obtained, including particularly repeatable timing errors that arise owing to any eccentric mounting of the grating with respect to the disks 21. This embodiment avoids the use of external equipment to measure timing errors such as repeatable timing errors and instead makes use of processing that is already carried out to adjust the phase of the servo patterns being written to the disks 21.

It is preferred that the cumulative phase adjustments made by the phase adjuster 6 are recorded over a large number of revolutions of the disks 21 in order to allow the assumption to be made that the phase lock loop constituted by the phase detector and phase adjuster was in practically perfect lock at all times. However, in order to speed up the data acquisition process, the data collection may be performed only over a relatively small number of revolutions. Various algorithms and iterations can be applied to ensure that no peak in the phase error exceeds a predetermined limit.

In those embodiments of the servo track writer 20 in which the grating is not fixed to one of the disks 21, and is instead for example fixed more or less permanently in relation to the motor 23, it will be understood that repeatable timing errors that arise from any eccentric mounting of the grating will remain the same throughout the effective lifetime of the grating and servo track writer combination. Thus, once the timing errors have been characterised for a particular grating and servo track writer combination, it will not be necessary to restart this whole process of acquiring data relating to the phase adjustments made for the servo pattern generator to calculate the individual phase angles P for the look-up tables 45. On the contrary, the phase angles P obtained on a previous run may be re-used, at least initially to "seed" this optimisation process for subsequent runs.

The techniques described above for removing the repeatable timing errors can be adapted for use during testing and characterising of the servo track writer 20. In particular, by taking longer averaging periods, measurements of the timing error can be made, rather than for example carrying out iterations to force the timing error towards zero. This technique can then be used to characterise variations in the speed of the motor 23, or defects in the gratings, or the like. In this respect, it may be helpful to analyse the error signals in the frequency domain to help identify the cause of the individual errors.

In a preferred embodiment, the clock signal 44 that is output by the interpolation cell(s) 40 is passed to a "jitter filter", which in the preferred embodiment is a 1:1 phase locked loop (PLL), before being passed to the phase detector 10. This "clean-up" PLL is used to control the frequency content of the clock signal 44 and to remove high frequency components which might be introduced as a result of quantisation in the interpolation cell(s) 40 and other imperfections in the processing electronics 27.

Figure 6:
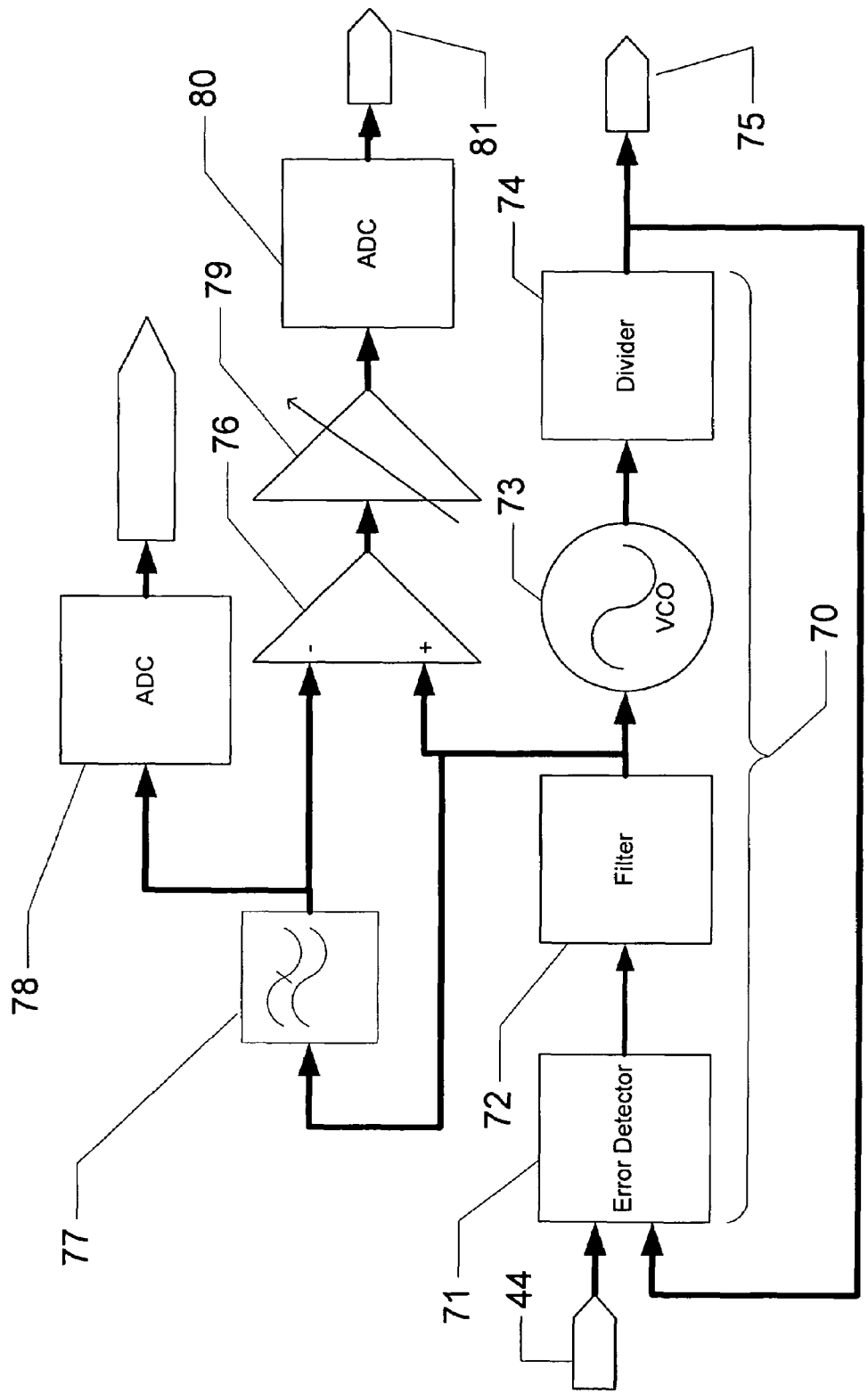
FIGS. 6 to 8 show schematically diagrams of examples of circuits for characterising repeatable timing errors in a servo track writer; and, FIGS. 9 to 14 show schematically diagrams of examples of circuits for processing of signals from an optical detector.

Thus, referring to FIG. 6, the clock signal 44 is passed to a PLL 70. The PLL 70 has a phase or error detector 71 which receives as a first input the clock signal 44. An error signal is passed to a filter 72, which defines the frequency tracking properties of the PLL 70 and provides a control signal to a voltage controlled oscillator (VCO) 73. As is well known, the frequency that is output by the VCO 73 is determined by the voltage on its control input received from the filter 72. This signal output by the VCO 73 may be divided down in frequency by a divider 74 to divide down the frequency output by the VCO 73 to the required output frequency of the final outgoing clock signal 75. The output of the divider 74 is also passed as the second input to the error detector 71. In a manner known per se, therefore, the PLL 70 provides a final output clock signal 75 that has the same frequency as the fundamental frequency of the incoming clock signal 44, but has removed any static or noise or the like and thus accomplishes signal reconditioning.

The PLL 70 enables an alternative arrangement for characterising and removing repeatable timing errors. In particular, by measuring the control voltage applied to the VCO 73 with respect to the grating lines, it is possible to characterise the timing error at any point around a revolution of the grating. By averaging this over many revolutions, the repeatable portion of the timing error can be extracted.

For example, in the embodiment shown schematically in FIG. 6, an output of the filter 72 is passed as a first input to a subtracting junction 76 and also to a low pass filter 77. The low pass filter 77 is set with a cut-off frequency that is many times lower than the rotational frequency of the grating. The output of the low pass filter 77 is preferably passed to an analogue-to-digital converter (ADC) 78 which effectively outputs the DC (direct current) content of the signal coming out of the filter 72. The output of the low pass filter 77 is also passed to the other input of the subtracting junction 76. The output of the subtracting junction 76 therefore represents the variations in the control voltage being applied to the VCO 73. This output is passed to a variable gain amplifier 79, which can boost the output of the subtracting junction 76 as need be: it will be understood that the variations in the control voltage applied to the VCO 73 are likely to be relatively very small. The output of the amplifier 79 is passed to another ADC 80, the output of which is therefore a measure of the timing errors. This output 81 can be averaged over many revolutions. This (averaged) output 81 can then be used to determine the timing error arising at each point around the grating 25, and that data can then be integrated to determine the repeatable timing error. This can then be fed back to determine and improve the phase angles P which are stored in the look-up tables 45, thereby to remove or at least reduce the repeatable timing errors.

Figure 7:
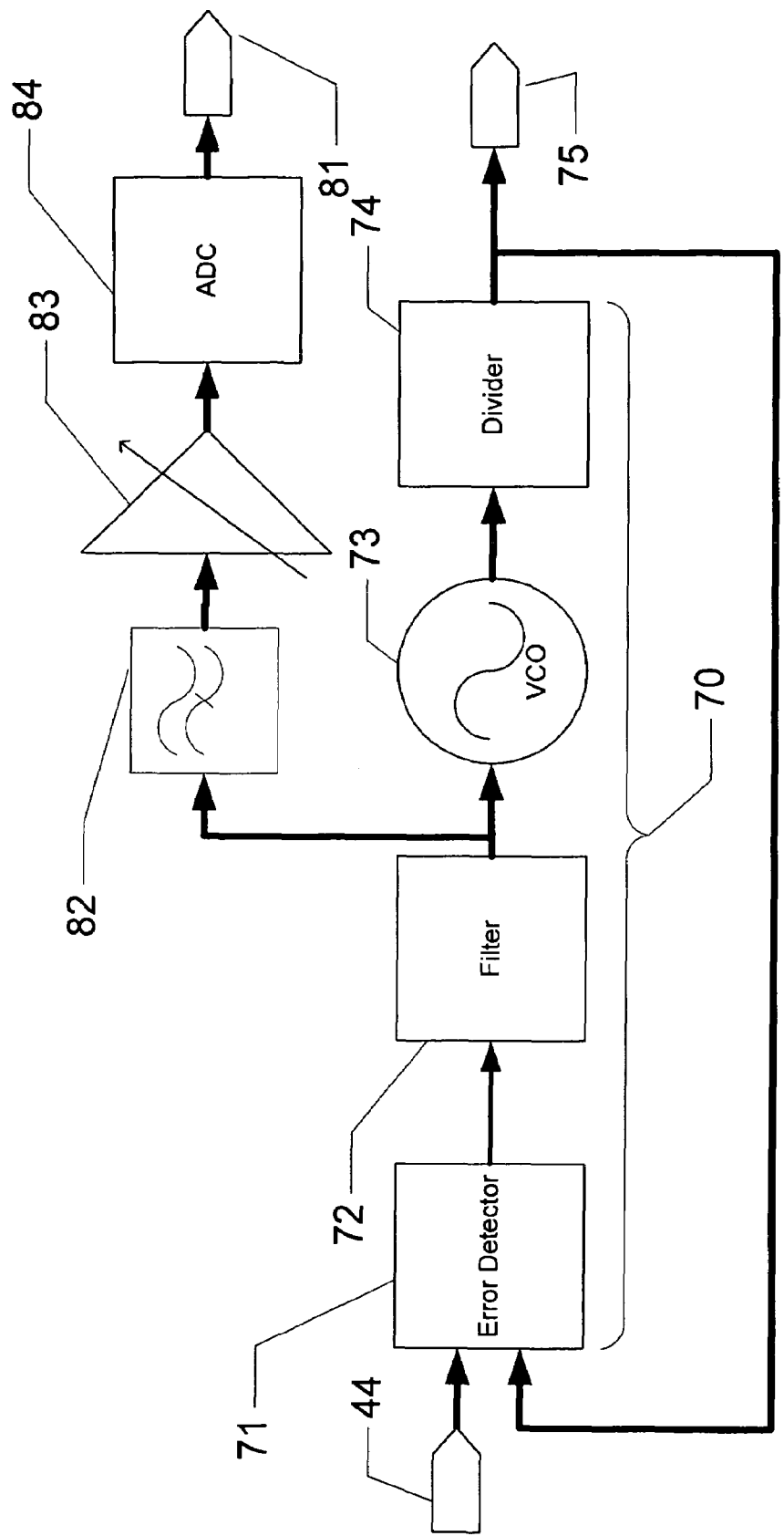

If it is not desired to monitor the DC content of the control signal passing to the VCO 73, then, as shown by way of example in FIG. 7, the VCO control signal can be passed to a high pass filter 82. This high pass filter 82 therefore outputs a signal that is representative of the changes in the voltage of the control signal being applied to the VCO 73. The output of that high pass filter 82 is passed to a variable gain amplifier 83, the output of which is passed to an ADC 84. Further treatment can then be as for the example shown in FIG. 6.

Figure 8:
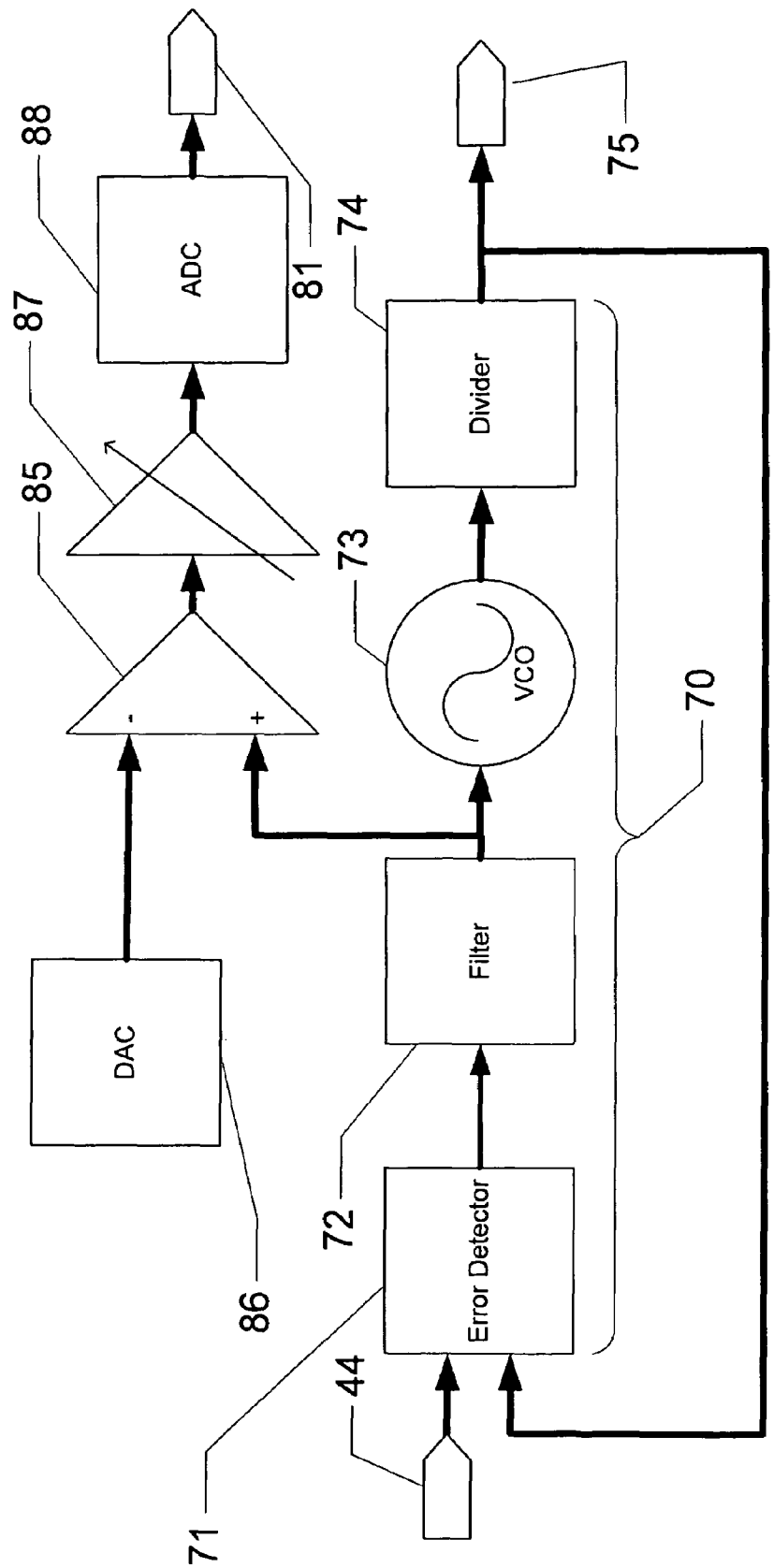

FIG. 8 shows schematically another example of determining the repeatable timing error. In this example, the control voltage being applied to the VCO 73 is applied as one input to a subtracting junction 85. The other input to the subtracting junction 85 is the output of a digital-to-analogue converter (DAC) 86. The output of the subtracting junction 85 is passed to a variable gain amplifier 87, the output of which is again passed to an ADC 88 which outputs the error signal 81. In use, initially the output from the DAC 86 is set to zero and the gain of the amplifier 87 is set low. Then, by an iterative process, the output of the DAC 86 is increased in steps and the gain of the amplifier 87 is correspondingly increased. This iterative process gradually brings the output of the DAC 86 up to the DC level of the control voltage being applied to the VCO 73. This process means that the maximum possible dynamic range of the ADC 88 is centred on the deviations of the control voltage being applied to the VCO 73, which in turn means that a more precise measurement of this deviation is obtained. This digital method offers the advantage of providing control over the bandwidth of the extraction of the DC component of the control signal being applied to the VCO 73, which is particularly beneficial given that the grating in use may be rotated at a rotational frequency that is within a wide range.

An undesirable effect of the larger gain is an increase of noise observed by the ADC 80,84,88. To reduce the effects of such noise, over-sampling and post-filtering techniques can be applied, such techniques being known per se. Since the highest frequency component within the repeatable timing error term is likely to be less than twenty times the rotational rate of the grating, large numbers of measurements around the revolution are not required. The use of decimation within the post-filtering technique lowers the measurement sample rate. After averaging the measurement data over a number of revolutions, the repeatable timing error can be extracted by determining the movement of the VCO control voltage from the mean at each interpolated point, and then integrating.

The relationship between the VCO control voltage and its output frequency, i.e. the transfer function of the VCO, is unlikely to be sufficiently well defined for measurement purposes. Moreover, the transfer function is likely to be affected by temperature and component variation. However, if the extremities of the operating range of the VCO are avoided, then a good approximation is to assume that the transfer function is linear.

It will be noted that an absolute measurement of the error is not required in order to eliminate the repeatable timing error. On the contrary, all that is required is that the VCO control voltage be flat for the entire revolution. By making the measurements in the "clean-up" PLL 70, which cleans up the signal after interpolation, the measurement of and correction for the error is performed in a closed loop fashion. This makes it possible to measure and iterate towards a minimal repeatable timing error solution with a great level of accuracy. It is possible to iterate towards this minimum solution by using for example a binary search algorithm. To enhance the iteration efficiency, however, an estimate of the relationship between a change in VCO control voltage and a change in the position of the timing mark is required. A coarse estimate can be determined from a theoretical understanding of the system and the relevant data sheet for the VCO. Once more than two iterations have been made, data exists for a change in VCO voltage versus a change in timing mark position. Using standard mathematical techniques, a function can then be fitted to this data in order to generate a better estimate of the relationship and thus enhance the elimination of the repeatable timing error.

As with the other technique for eliminating the repeatable timing error discussed above, this technique can be adapted to allow measurement and therefore characterisation of the error. For example, by taking longer averaging periods, measurements can be made that can be used to characterise variations in the motor speed or defects in the grating, which may be useful for characterising and testing systems. For these purposes, it may be helpful to look at and analyse the error signal in the frequency domain in order to help identify the causes of the error.

Apart from the obvious advantage of removing or minimising the timing error in the servo patterns that can arise because of the repeatable timing error, minimising or eliminating the repeatable timing and other timing errors has other advantages. It should be borne in mind that the repeatable timing error can be approximately 20 Hz whereas for example disk speed variations might only be 1 Hz. Thus, where the repeatable timing error is minimised or effectively eliminated, the pattern generator 7 does not have to allocate effective bandwidth to dealing with large timing errors, and therefore more of its bandwidth can be applied to its main task of pattern generation. In the case where a vector modulator is used as the phase adjuster 6, the step size of the vector modulator can be small, which means that when in lock, only small movements of the vector modulator around zero occur. This leads to a small overall residual phase error (which inevitably will be within ±½ step size). Where a phase locked loop is used to correct the repeatable and other timing errors, a phase locked loop of lower bandwidth can be used, which reduces costs and/or improves efficiency. In general this means that more accurate writing of the servo bursts to the disks 21 takes place, which means that lower bandwidth corrections are necessary, meaning that lower bandwidth components can be used.

Figure 4:
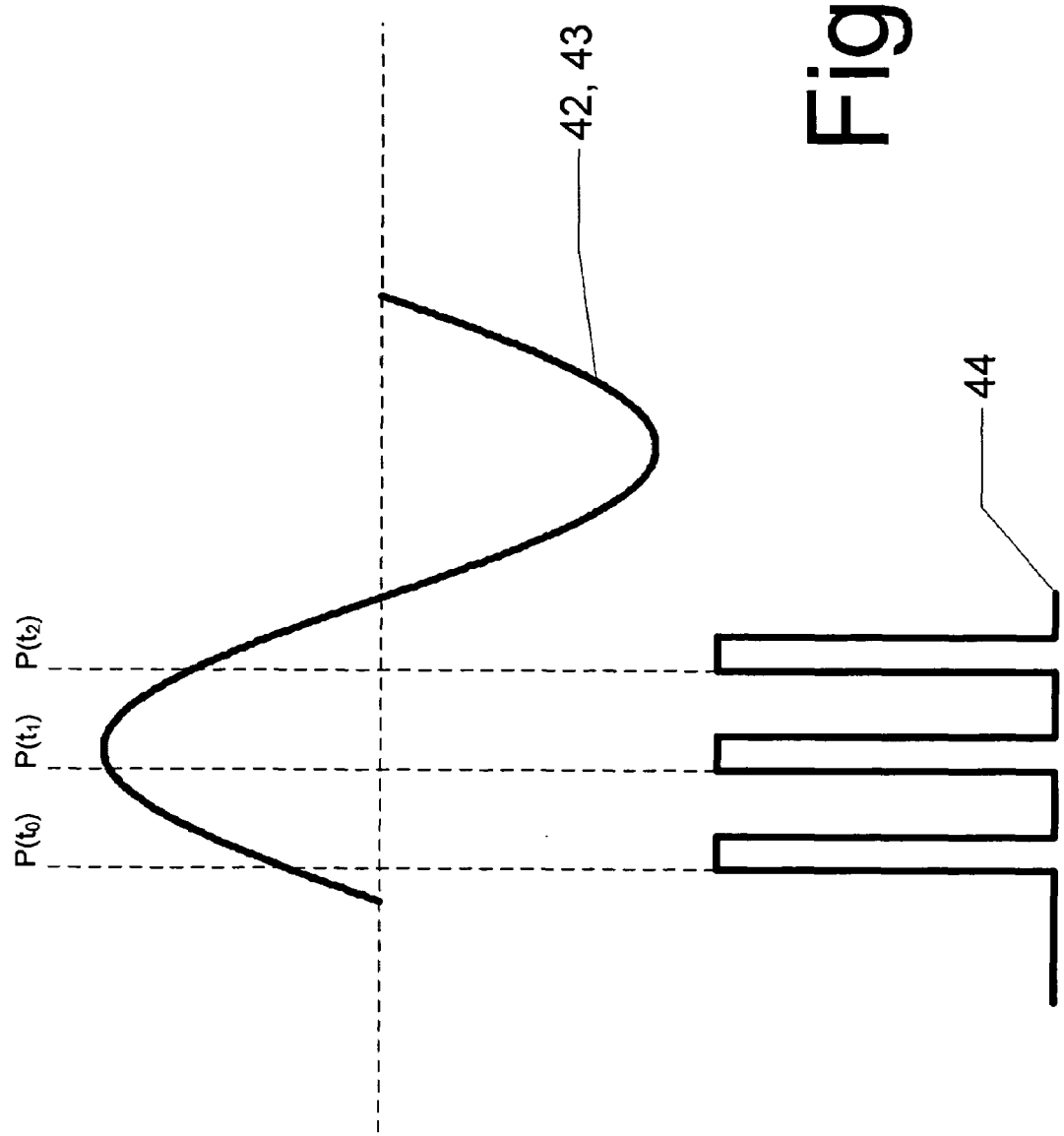
FIG. 4 shows schematically interpolation of a signal.
Figure 5:
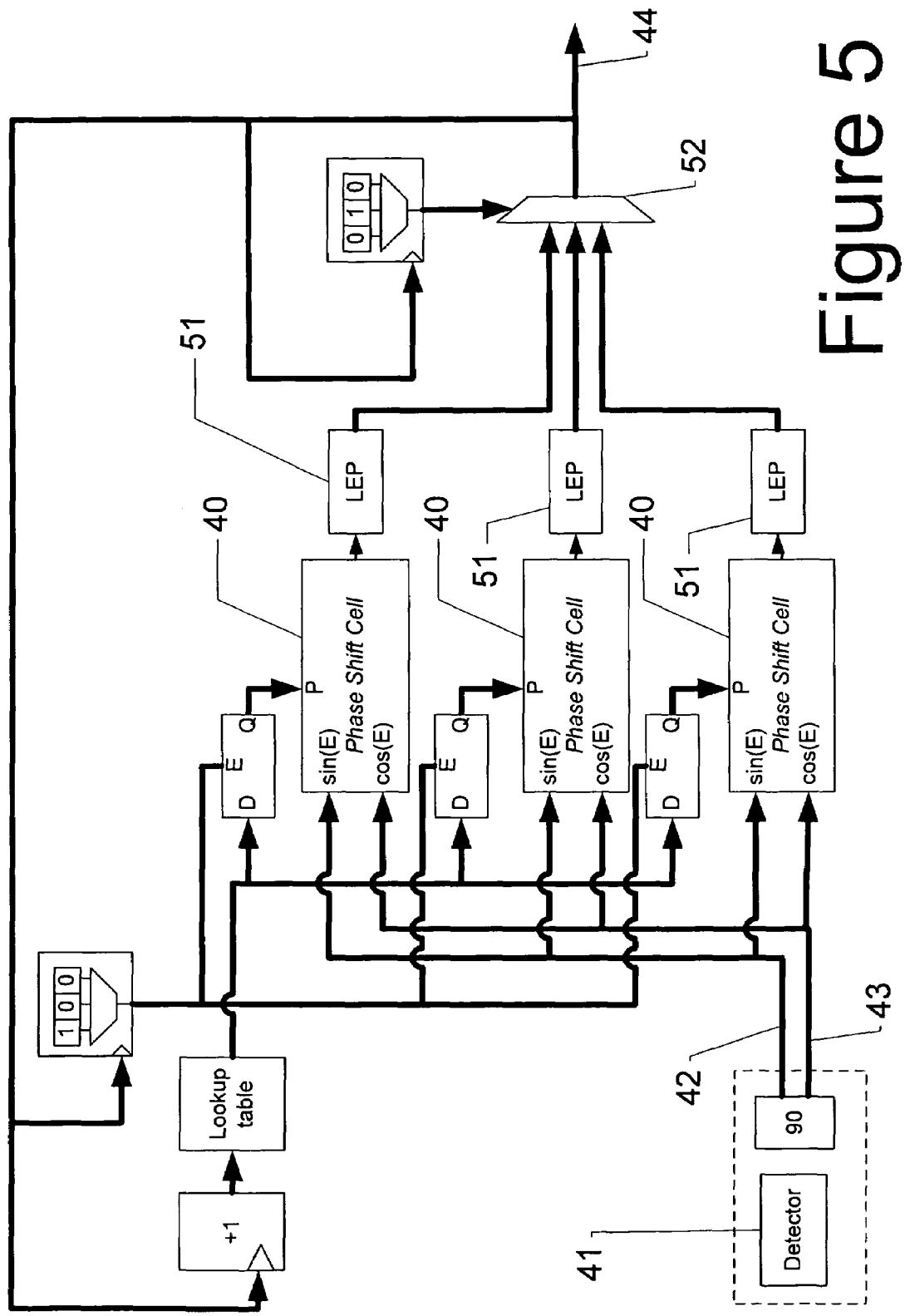
FIG. 5 shows a schematic block diagram of an example of an interleaved interpolator using three interleaved interpolation cells.

In for example FIGS. 4 and 5 described above, it is simply shown that the output(s) of the optical detector 41 is passed directly to the interpolation cell(s) 40. However, it can be of advantage to apply some processing treatment to the output(s) of the optical detector 41 prior to the interpolation process. The immediately following description relates to such "front end" processing. Whilst the techniques discussed herein are of particular application in the field of servo track writers, in principle these processing techniques as applied to the output of an optical detector can be applied in other fields.

Figure 9:
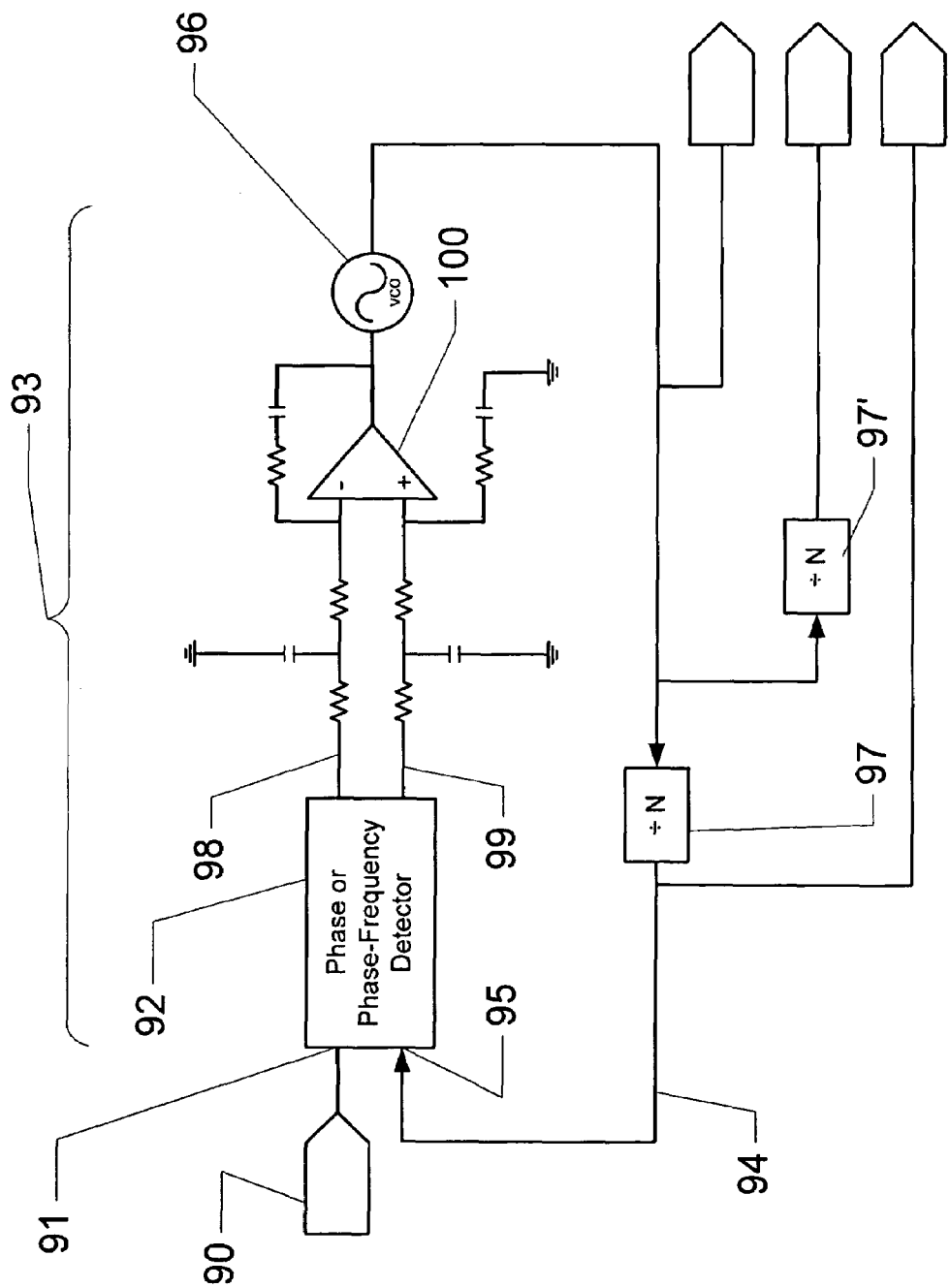

Referring now to FIG. 9, a signal 90 from an optical detector is shown. In the context of the servo track writer described above, this signal 90 may be a digital or sinusoidal output from an optical detector 41 as described above, which is optionally divided down in frequency if necessary and which is treated by the circuit in FIG. 9 prior to being passed to the interpolation cell(s) 40 shown in FIGS. 4 and 5.

In this example, the output 90 is passed to the reference input 91 of the phase or error detector 92 of a phase locked loop 93. For convenience, this particular PLL 93 and the corresponding PLLs of the other examples described further below will sometimes be referred to herein as the "front end" PLL 93 to distinguish it from the one or more other PLLs that might be used after the interpolation process to produce the final clock signal. The signal 94 that is passed to the other input 95 of the error detector 92 is the signal that is output by the VCO 96 of the PLL 93. This signal output by the VCO 96 may be divided down in frequency by a divider 97 prior to being passed to the error detector 92 if necessary. In a manner known per se, the outputs 98,99 of the error detector 92 are passed as the input to an error amplifier 100 of the PLL 93.

When locked, the circuit shown in FIG. 9 causes the output of the VCO 96 to track the signal 90 from the optical detector, including its sidebands, up to a specific offset frequency. At higher sideband offset frequencies, the operation of the error amplifier 100 is such as to perform a cross-over function between the sidebands of the signal 90 from the optical detector and the open-loop sideband output of the VCO 96. In effect, the PLL 93 operates as a band pass filter, the centre frequency of which is exactly the frequency of the signal 90 from the optical detector and the bandwidth of which is determined by simple resistive and capacitive components (shown but not labelled in FIG. 9) in the PLL 93. Possible locations to take off the output signals for the subsequent interpolation process are shown, these being optionally the direct output of the VCO 96, the output from the divider 97, or the output from another divider 97'.

The use of the PLL 93 in the manner described above with reference to FIG. 9 has a number of advantages. For example, because the centre frequency of the PLL 93 tracks the frequency of the detector output signal 90 precisely, the bandwidth of the PLL 93 can be set to match precisely the bandwidth of the incoming signal 90, which maximises the signal-to-noise ratio. In order to change the bandwidth, it is necessary to change only the few resistors and/or capacitors shown in FIG. 9 to others having different values. Moreover, in the preferred embodiments, operating directly on the sinusoidal output 90 of the optical detector means that more of the phase information in the signal 90 can be preserved and used. This is in contrast for example to the circuit shown in U.S. Pat. No. 5,909,333 in which the output of the photo detector is first passed to a square wave generator so that the signal that is passed to the phase locked loop of that prior art is a generated square wave rather than the original sinusoidal output of the optical detector.

Figure 10:
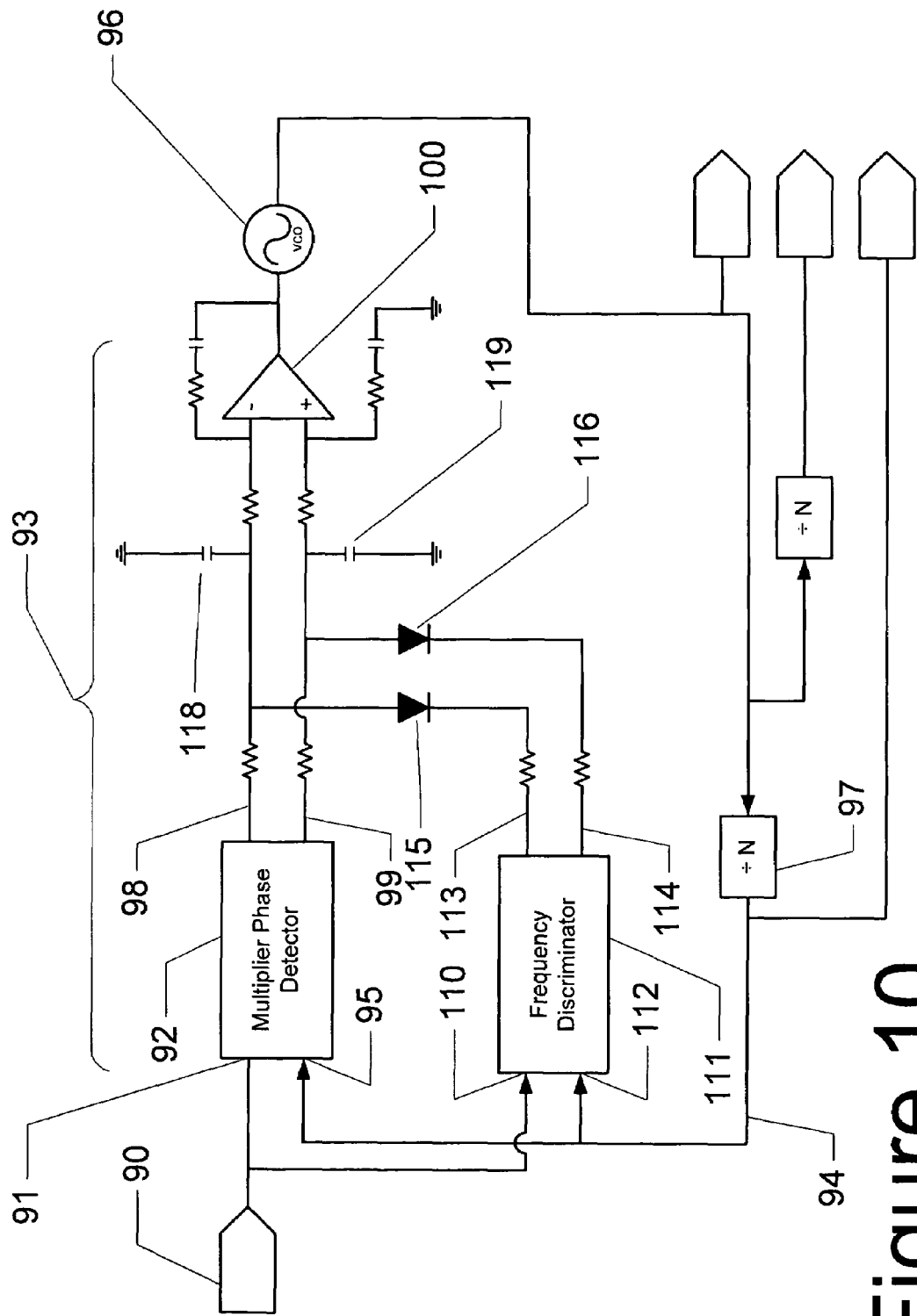

Further advantage can be obtained by modifying the circuit shown in FIG. 9, as shown by way of example in FIG. 10. In this example, the signal 90 obtained from the optical detector is passed additionally to a first input of a frequency discriminator 111, an example of which is shown in more detail in FIG. 11. The output signal 94 from the VCO 96, again optionally divided down as necessary, is additionally provided at the second input 112 of the frequency discriminator 111. The two outputs 113,114 of the frequency discriminator 111 are connected via respective diodes 115,116 to the outputs 98,99 from the error detector 92 of the PLL 93, i.e. to the respective inputs of the error amplifier 100.

Figure 11:
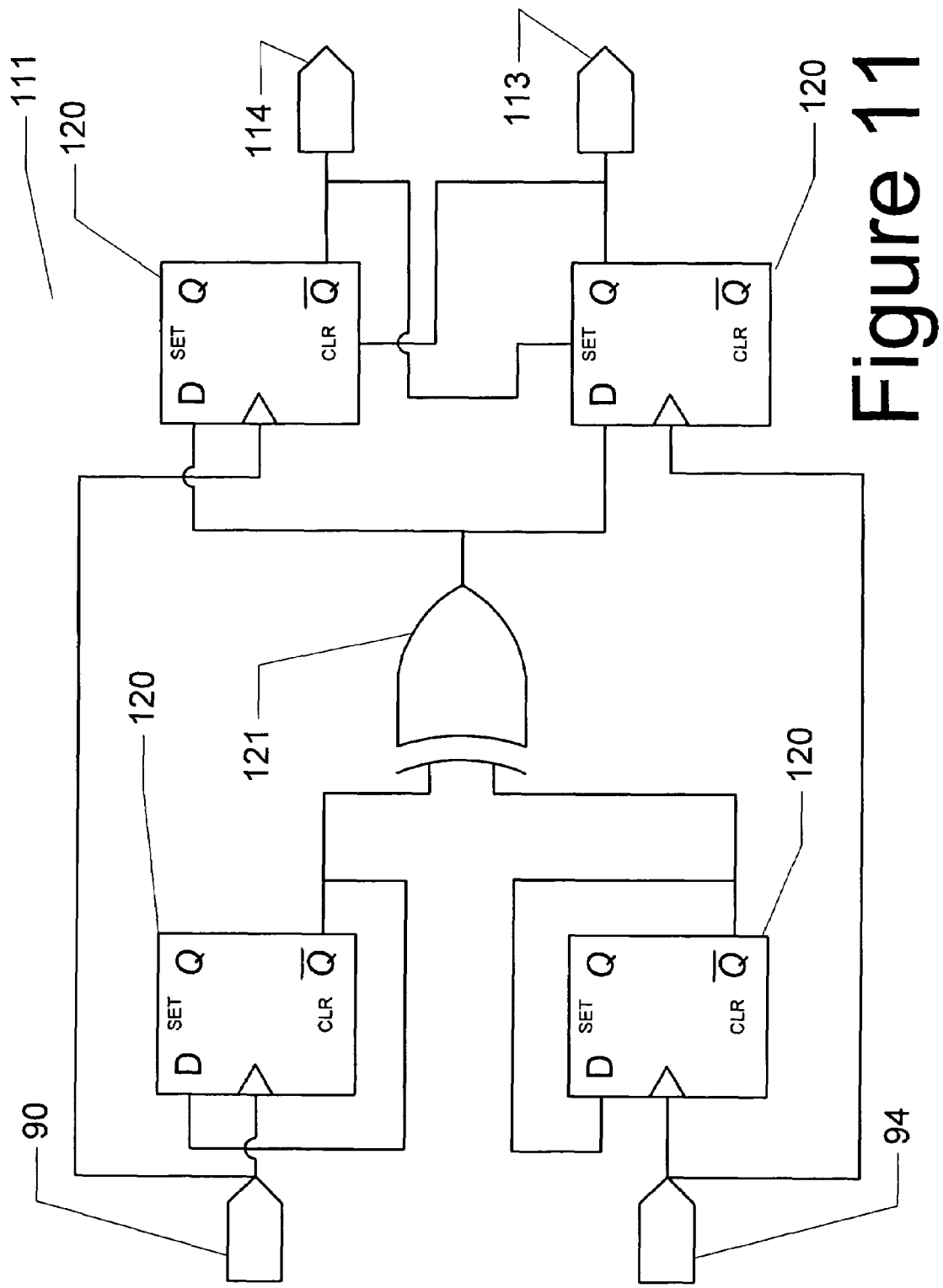

Referring briefly now to FIG. 11, as mentioned above this shows one example of a frequency discriminator 111, which is known per se. Four D-flip-flops 120 are interconnected as shown. The clock input to two of the flip-flops 120 is the signal 90 obtained from the optical detector. The clock inputs to the other two flip-flops 120 is the signal 94 output by the VCO 96. The outputs 113,114 of the frequency discriminator 111 are indicated. Element 121 is an exclusive-OR function.

In operation, when the outputs 113,114 from the frequency discriminator 111 are high, which occurs when the frequency of the VCO output signal 94 is below or above that of the detector output signal 90 respectively, these outputs 113,114 are not connected to the error amplifier 100 because of the blocking action of the diodes 115,116. If the output 113 of the frequency discriminator 111 toggles, which happens when the frequency of the VCO output signal 94 drops below that of the detector output signal 90, then current is drawn through the respective diode 115 from the grounded capacitor 118 on the inverting input of the error amplifier 100. This causes the output of the error amplifier 100 to increase, which therefore increases the frequency of the VCO 96. On the other hand, when the other output 114 of the frequency discriminator 111 toggles, which happens when the frequency of the VCO output signal 94 increases above the frequency of the optical detector output signal 90, current is drawn through the respective diode 116 from the grounded capacitor 119 on the non-inverting input of the error amplifier 100. This in turn decreases the output of the error amplifier 100, thus decreasing the frequency of the VCO output signal 94 as required.

Thus, the action of the frequency discriminator 111 is in effect to inject pulses of current into the input of the error amplifier 100 as required, the pulses indicating the sign of the frequency difference between the VCO output signal 94 and the detector output signal 90, and thus indicating the direction in which the VCO 96 should move. It will be noted that the switching diodes 115,116 only allow the frequency error signal to reach the error amplifier 100. Once the respective frequencies are identical, only phase error signals are passed from the phase or error detector 92 of the PLL 93 to the error amplifier 100, resulting in a high resolution phase locked condition. This means that phase information in the incoming detector signal 90 is preserved. Bearing in mind that in the preferred embodiment this incoming detector signal 90 is sinusoidal, this is a valuable advantage. For example, without such phase information, it is necessary to rely entirely on the zero-crossing points of the incoming signal from the detector, but the zero crossing points are not a good indicator of the true phase of the fundamental frequency of the incoming detector signal 90, particularly in the presence of substantial and potentially varying amounts of even harmonic distortion in that detector signal 90. (When the frequency of the VCO 96 and the incoming detector signal 90 are not matched, the phase detector 92, which in this example is a multiplier phase detector 92, outputs a signal that alternates from positive phase error to negative phase error, but whose average is zero phase error. When combined with the one-sided push from the frequency discriminator 111 as described above, the PLL 93 will eventually reach lock.)

Figure 12:
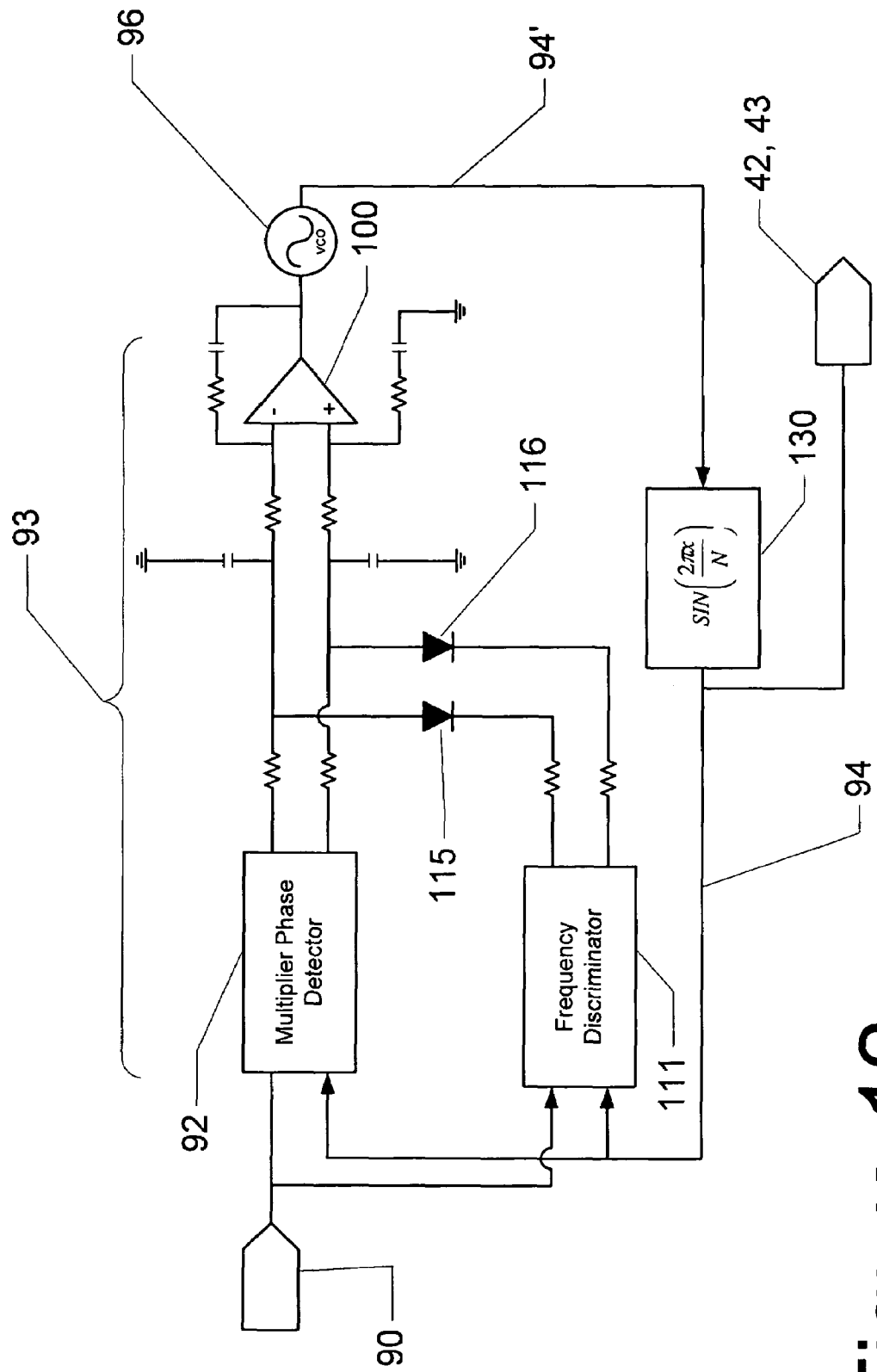

Referring now to another variation shown schematically in FIG. 12, in this example the VCO 96' is of much higher frequency than the VCO 96 of the earlier examples, and operates at n times the desired output frequency. The output 94' from the VCO 96' feeds a divide-by-n counter, a sine function look-up table (for values 0,1, . . . (n−1)), a digital-to-analogue converter (DAC) and a low pass filter, all shown schematically in a single block 130. Successive outputs from the DAC are $\sin(2\pi x/n)$ where x is an integer. The number n should be larger than the ratio of the highest DAC output frequency to the lowest DAC output frequency, preferably by a factor of at least two or three. This ensures that the DAC switching frequency (which is n times the output frequency) is sufficiently above the highest DAC output frequency that the DAC switching frequency can be attenuated using a low-pass filter. The effect of this is to provide the effective VCO output signal 94 as a high purity sine wave, which is better suited to be compared with the signal 90 incoming from the detector. This therefore avoids distortion which might otherwise arise in the signal that is output by the VCO 96 and therefore minimises errors that might arise in the later interpolation process.

Where the optical detector outputs two quadrature signals as mentioned above, two circuits like those shown in FIG. 12 could be used, one for each of the output quadrature signals, to provide high purity sinusoidal signals 42,43 for the interpolation process described above.

Figure 13:
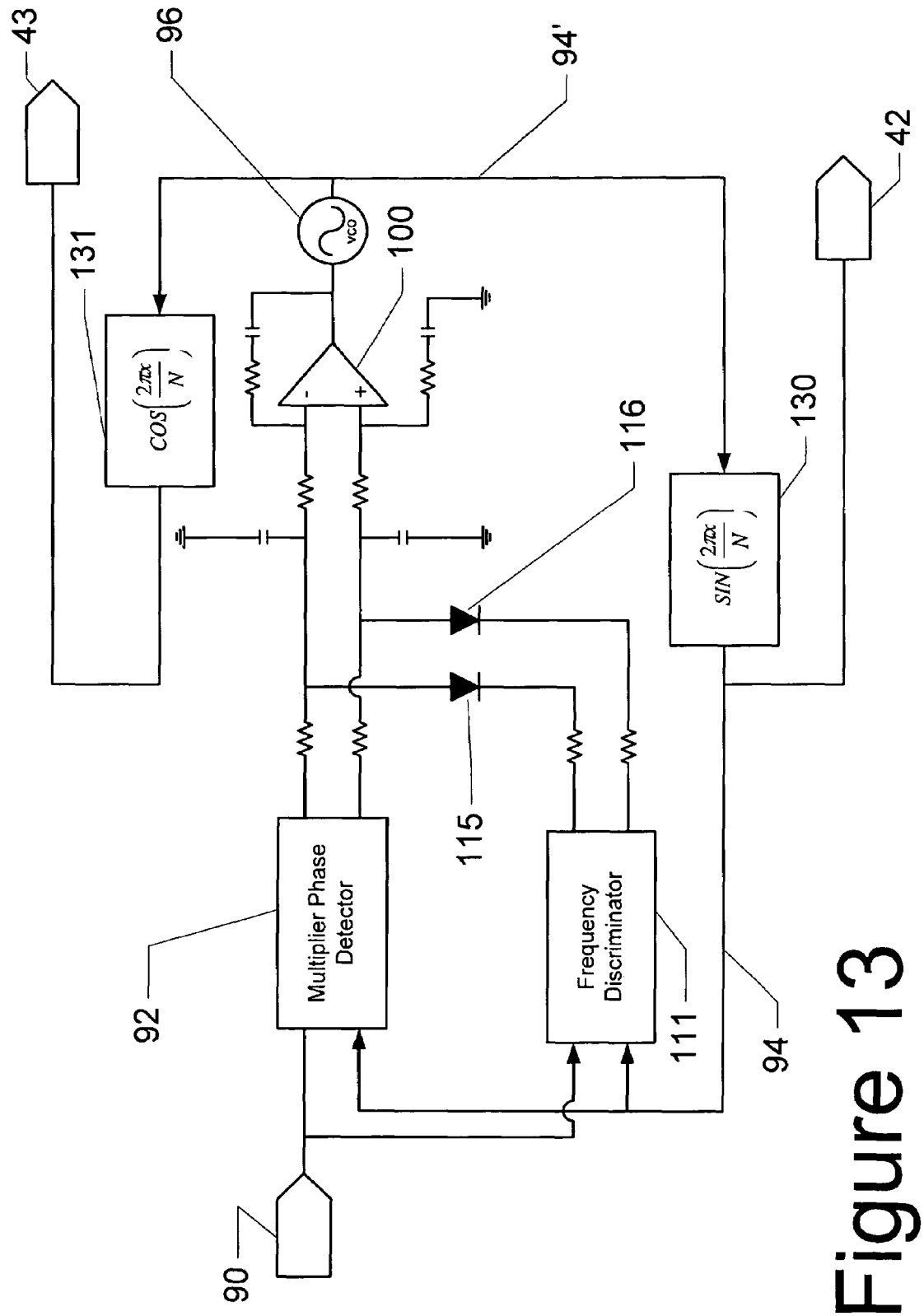

On the other hand, and referring now to FIG. 13, if the value of n is divisible exactly by four, the output of the divide-by-n counter in the sine block 130 can also be passed to a cosine function look-up table, a second DAC, and a second low pass filter, all shown schematically within the single block 131. (It will be understood that the divide-by-n counter in the block 130 is the same counter used in the cosine block 131, and that these are shown separately for clarity in the drawing.) Successive outputs from the DAC in the cosine block 131 are $\cos(2\pi x/n)$, where x and n are the same integers as above. The outputs of the sine and cosine blocks 131,131 are in practically perfect quadrature (within the limits of any differences in phase response between the DACs and the low pass filters in the sine and cosine blocks 130,131). Accordingly, the outputs of the sine and cosine blocks 130,131 are ideally suited for use as the output signals 42,43 which are used in the interpolation process described above.

It will be noted therefore that the circuit of FIG. 13 can be used to create quadrature signals, which can be used in the interpolation process, from a single encoder input signal 90. As has been mentioned above, optical encoders typically use an analogue detection arrangement. Whilst many optical encoders output two analogue signals in quadrature, some optical encoders output only a single analogue signal. Also, optical encoders typically output a single digital output signal. Thus, the circuit of FIG. 13 can be used in such circumstances to generate the quadrature signals 42,43 that are used in the preferred interpolation process described above from a single (analogue or digital) signal coming from the optical encoder. The combination of the DACs and low pass filters in the sine and cosine blocks 130,131 creates a level output, i.e. an output that has a stable amplitude as a function of frequency. Moreover, by creating the VCO sine wave and cosine waves 42,43 from a single high frequency source, both outputs 42,43 have extremely low distortion and are separated by practically exactly 90°. Though there may be a slight loss of information that was available in the case where the optical detector outputs two analogue signals (the loss being because one of the signals is ignored), the advantages may outweigh this loss.

Figure 14:
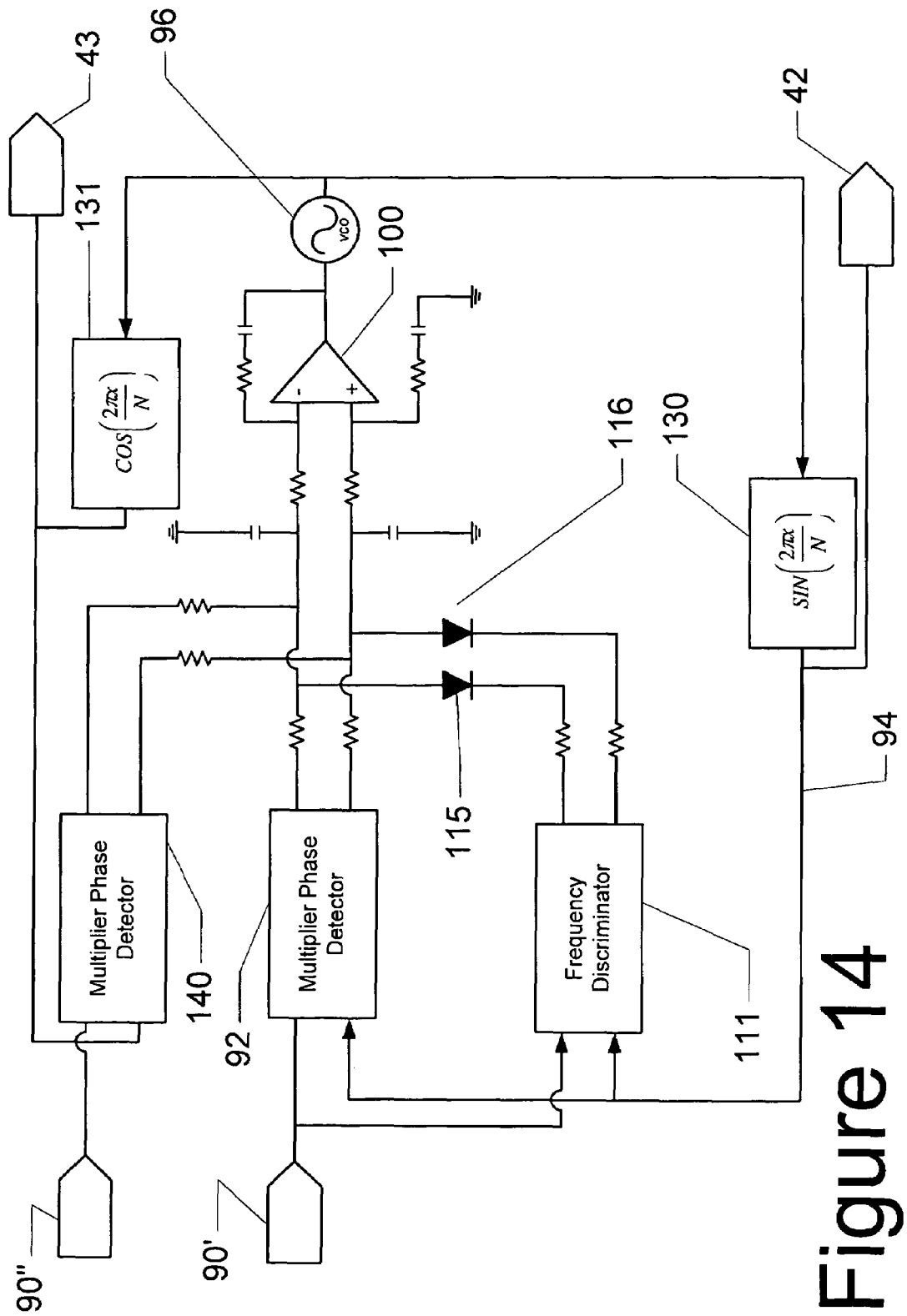

A further variation is shown schematically in FIG. 14. In this example, which is applicable to those optical detectors that output two analogue detection signals, one of these output signals 90' is treated as described above. The other output signal 90" is passed as a first input to another phase or error detector 140. The other input to the second error detector 140 is the output of the cosine block 131 discussed above. When the VCO 96 is perfectly phase-locked to the rotating grating, the combination of the error detectors 92,140 will be outputting zero average signal, indicating no phase error. If there is any noise arising in the optical detector or the grating that is common to the two signals 90',90" from the optical detector, then the circuit of FIG. 14 tracks that noise as if there were a single error detector. In other words, in this instance, the presence of the second phase detector 140 neither adds to nor detracts from the system. On the other hand, if there is noise arising that is not common to the two detector output signals 90',90", the presence of the two error detectors 92,140 improves the signal-to-noise ratio by a factor of $\sqrt{2}$. Moreover, if there is any deviation from the ideal of 90° between the detector output signals 90',90", the single error amplifier 100, which receives input from both error detectors 92,140, attempts to track the average of the two optical detector signals 90',90", whilst the outputs 42,43 from the sine and cosine blocks 130,131 still retain their practically perfect 90° phase relationship.

Whilst it has been described that the sine and cosine blocks 130,131 use a counter and DAC combination, these could be replaced by for example a shift register circulating a pattern (such as half ones followed by half zeros) and a summing resistor from each of the taps of the shift register to a summing node. With the proper selection of pattern and summing resistor values, the resulting current sum is a close approximation to a sine or cosine wave.

Returning now to the removal or avoidance of timing errors in the clock signal generated by the processing electronics, as discussed above the jitter filter 70 reduces the jitter introduced by the interpolation electronics 27 and the optical detector 26. The loop bandwidth must provide a good balance between the attenuation of undesirable non-repeatable error terms whilst allowing large repeatable timing error (RTE) terms to be measured. The majority of the RTE is caused by the eccentricity of the mounting of the encoder grating 25 relative to the centre of rotation of the spindle 22, and is at the same frequency (1st harmonic) as the rotational speed of the spindle 22. This typically lies well within the pass band of the jitter filter 70.

In practice, once the large, 1st harmonic RTE has been eliminated, it has been found that other RTE features at significantly higher frequencies have become significant. This includes the harmonics that can be associated with manufacturing imperfections in the encoder. These harmonics may lie in the attenuating region of the filter and can be affected by significant phase distortion. This distortion results in those frequency terms associated with encoder imperfections being perceived to be in a different position than they truly are and thus, when correction is applied with the interpolator, a residual error is left behind. As a number of iterative passes are used to measure and correct the error, in practice these errors start to grow and place a limit on the number of correction cycles.

To avoid or ameliorate this problem, in one embodiment a digital "equalisation" filter is applied to the measured RTE data to apply phase delay in those areas of the spectral response where no phase delay occurs in the jitter filter 70, such that the cascaded response of the jitter filter 70 and the equalisation filter has a much flatter phase delay response. The equalisation filter can be embodied in the processor 30 discussed above. The equalisation filter 30 preferably has unity gain at all frequencies so that the magnitude of the response is unaffected. As this processing operation does not have to be conducted in real time, and instead the interpolation table can be reconstructed in an off-line operation, the entire equalised RTE dataset can have a circular shift operation applied to it opposite to the group delay of the cascaded filters 70,30 to negate the effect of processing.

In order to simplify the calculation of the digital filter coefficients for the equalisation filter 30 and ensure that it has an order that is not excessive, the data from the RTE measurement may be decimated (typically there is one measurement point per interpolation point up to 512K in the current electronics) to approximately 500 points per revolution. This can be done with a sliding running average followed by decimation by interpolation. The resulting decimated data is passed though the equalisation filter 30 and circularly shifted as described above. The data is then interpolated back up to a higher sample rate, ready for use in the interpolation table, using for example a linear interpolation algorithm.

As a result of numerical errors in the processing scheme one final stage may be used. It is very important for the interpolator's function that no phase jumps exist when the interpolation table wraps around on itself, otherwise a so-called closure error will occur in the resulting optical clock track. This can effectively be removed by linearly distributing the error and subtracting it from the dataset as shown below:

$$T(x) = N(x) - \left[\frac{N(\text{end}) - N(1)}{\text{end}} x + N(1)\right]$$

where the input dataset is N(1: end) and the output of the processing operation is T(1: end).

In general, the equalisation filter 30 is good at levelling out phase delay at very low frequencies around the first harmonic, but some distortion occurs in the low frequency pass band of the jitter filter 70 which, without the equalisation filter 30 in the process, is largely undistorted. It has been found that the best results are achieved by using the equalisation filter 30 in all but the last iteration of the sequence when only the running average is used to smooth out higher frequencies. This allows the higher frequency components to be well measured and eliminated, and then finally removes the last of the first harmonic energy of which a small residual error persists. Whether to use the equalisation filter 30 and what running average length to apply may be made user-configurable and tuneable, based upon a number of factors including: spindle characteristics, rotational speed, encoder characteristics, and jitter filter characteristics.

Further experimentation has revealed that once repeatable timing errors have been minimised, using for example one or more of the techniques discussed above, non-repeatable timing errors (NRTE) can become a problem. (NRTE in this context refers to errors asynchronous to the rotating shaft. Nevertheless, the stability of their frequency, phase and magnitude may be quite high.) For example, due to the mounting position of the optical detector 26 and/or grating 25, non-repeatable timing errors (NRTE) may be seen by the detector 26 but are not seen by the heads 24 performing the writing of the servo tracks. These non-repeatable timing errors therefore get written into the servo pattern and form a fraction of the track-to-track phase error (TTPE). It is therefore preferred to eliminate or at least reduce the NRTE. This can be carried out in the following manner.

First, systems analysis is performed to determine which timing error frequency modes are unique to the optical clock and not seen by the writing heads, i.e. the NRTE of interest in this embodiment. The timing error shows up as a phase modulation on the clock signal being generated. This can be extracted at the phase detector outputs of any one of the three PLLs 10,70,93 which are used in the preferred apparatus 20. Of these the easiest to use is the PLL 10 applied before the pattern generator 7 as the detector signal from this PLL 10 is already digital in the preferred embodiment. However, the phase error from analogue PLLs may be digitised and used in this context.

The preferred technique for extracting the timing error from a PLL phase detector involves accumulating the phase detector output (after the error amplifier and filter in the case of the analogue PLLs) using the clock signal itself as a sampling clock. This signal can be decimated as necessary and can be multiplied by a gain term relating to the detector gain. The decimator could be replaced by a decimating filter if frequency components in excess of the Nyquist frequency of the decimated signal were of concern. However in the latter PLLs in the system (such as the pattern generator DPLL 10), the preceding filters will have removed most of the higher frequency content so this may not be of concern. It can be particularly useful to log the timing error signal to RAM for off-line analysis or pass the signal to a DAC where it be then analysed with laboratory instrumentation. This will assist in the process of identifying those terms for reduction as well other system performance characterisation that is otherwise difficult to perform.

The resulting timing error signal can have a band pass filter applied to determine the content at the previously identified frequency of interest. This can be done using techniques similar to those used in a spectrum analyser, a down converter followed by low pass filter. This can be implemented using for example a mixture of FPGA firmware and software processing. The width of the filter will be determined by the signal-to-noise ratio of the signal of interest, its proximity to signals at neighbouring frequencies, and its stability.

There can be as many band pass filters used to extract the phase and magnitude of error terms at a particular frequency as are required. Within a modest FPGA already in the apparatus 20, more than the one or two required within the current apparatus 20 can easily be accommodated. The timing error may need to be equalised to compensate for distortion that occurs in the filters.

As discussed more fully above, the preferred interpolator 40, shown in FIG. 3, operates by manipulating the phase of the signal output by the detector 41 and creating trigger points throughout the signal stream. The position of these trigger points are defined by a look-up table (LUT) 45 that is built during the RTE reduction process. Once the LUT has been loaded with an optimised sequence to compensate for the RTE, an offset 52 is then preferably applied through a summing junction 53 to position the index mark from the optical detector so as to be equispaced between two timing marks. This allows an index verifier maximum safety margin, an index verifier being a block within the apparatus 20 that counts the number of clock cycles between index marks to make sure the PLLs in the apparatus 20 have not lost lock.

As shown in FIG. 3, correction for the NRTE can then be applied by inserting an additional summing junction 55 between the LUT 45 and the sin/cos conversion blocks 46,47. This summing junction 55 is driven by a sinusoid generator, such as a numerically controlled oscillator (NCO) 56, whose magnitude 57, phase 58 and frequency 59 can be configured based on the analysis of the mechanical system and the timing error characterisation described above and corrected for the delays in the measurement system.

Whilst it is easier to characterise the timing error in the final DPLL 10 in the system as described above, this has the disadvantage that once the correction has been applied, it can no longer be measured unless the phase and/or magnitude of the error changes, at which point a residual error will become measurable. However, if the error is extracted from the first "tracking" filter 93, it can be constantly fed forward. The best strategy to adopt depends greatly on the stability of the NRTE term.

Embodiments of the present invention have been described with particular reference to the examples illustrated. However, it will be appreciated that variations and modifications may be made to the examples described within the scope of the present invention.

The invention claimed is:

1. A method of generating a clock signal from a moving medium, the method comprising:
   detecting movement of at least one mark that moves synchronously with the medium;
   producing a generally sinusoidal output signal corresponding to movement of the mark; and,
   interpolating said generally sinusoidal output signal by dynamically adjusting the phase of said generally sinusoidal output signal using a phase angle that is controllably varied to provide a clock signal having a higher frequency than said generally sinusoidal output signal,
   wherein the interpolation step dynamically adjusts the phase of the interpolated output clock signal to correct for errors in the phase of said output signal by adjusting said phase angle.

2. A method according to claim 1, wherein the interpolation step dynamically adjusts the phase of the interpolated output clock signal by detecting phase errors in the interpolated output clock signal and feeding back corrections into the interpolation step.

3. A method according to claim 1, wherein the medium is rotating and the at least one mark rotates synchronously with the medium.

4. A method according to claim 1, wherein the output signal comprises two components that are out of phase with each other, the interpolating including multiplying said components by variable amplitudes and summing the amplitude-multiplied components.

5. A method according to claim 4, wherein the variable amplitudes are varied at least to compensate for one or more non-repeatable timing errors that have previously been identified.

6. A method according to claim 4, wherein the detecting of the movement of the at least one mark is carried out by a detector that outputs two analogue signals which are used as or to form said two components of the output signal.

7. A method according to claim 4, wherein the detecting of the movement of the at least one mark is carried out by a detector that outputs a single signal that is used to form said two components of the output signal.

8. A method according to claim 4, wherein said two components of the output signal are exactly or substantially 90° apart in phase, the method comprising multiplying one of the components by $\sin(P_1)$ and multiplying the other of the components by $\cos(P_2)$ where $P_1$ and $P_2$ are variable phase angles that are varied at least according to the frequency required of the clock signal.

9. A method according to claim 8, wherein $P_1$ and $P_2$ are varied to correct for errors in the phase of said output signal.

10. A method according to claim 9, wherein the medium is a storage medium rotating at a rotational frequency which is obtained from a reference signal having a reference frequency; a servo pattern signal having a pattern frequency is obtained from said reference signal; the phase of the servo pattern signal is adjusted relative to the clock signal so that the servo pattern signal is in phase with the clock signal; and, a servo track in accordance with the servo pattern signal is written to the storage medium; the method comprising:
   monitoring the phase adjustments made to the servo pattern signal; and,
   setting values for $P_1$ and $P_2$ in accordance with the monitored phase adjustments made to the servo pattern signal.

11. A method according to claim 1, wherein the medium is a storage medium rotating at a rotational frequency which is obtained from a reference signal having a reference frequency; a servo pattern signal having a pattern frequency is obtained from said reference signal; the phase of the servo pattern signal is adjusted relative to the clock signal so that the servo pattern signal is in phase with the clock signal; and, a servo track in accordance with the servo pattern signal is written to the storage medium; the method comprising:
   monitoring the phase adjustments made to the servo pattern signal; and,
   adjusting the phase of the generated clock signal in accordance with the phase adjustments made to the servo pattern signal thereby to correct for errors in the phase of said output signal.

12. A method according to claim 10, wherein the servo pattern signal is obtained by passing the reference signal to two amplifiers the outputs of which are separated or shifted in phase relative to each other and summing said outputs, the phase of said servo pattern signal being adjusted by adjusting the gain of at least one of the amplifiers.

13. A method according to claim 9, wherein the clock signal is obtained after passing the signal generated from the interpolation to a phase locked loop having a phase error detector the output of which is used to provide a control signal to a voltage controlled oscillator of the phase locked loop, and comprising:
   monitoring variations in the control signal provided to said voltage controlled oscillator; and,
   setting values for $P_1$ and $P_2$ in accordance with the monitored variations.

14. A method according to claim 1, wherein the clock signal is obtained after passing the signal generated from the interpolation to a phase locked loop having a phase error detector the output of which is used to provide a control signal to a voltage controlled oscillator of the phase locked loop, and comprising:
   monitoring variations in the control signal provided to said voltage controlled oscillator; and,
   adjusting the phase of the generated clock signal in accordance with the variations in the control signal provided to said voltage controlled oscillator thereby to correct for errors in the phase of said output signal.

15. A method according to claim 14, comprising applying a selective phase delay to repeatable timing error data obtained by the step of monitoring variations in the control signal provided to said voltage controlled oscillator, thereby to correct for errors that can arise through operation of said phase locked loop.

16. A method according to claim 1, wherein the generally sinusoidal output signal corresponding to movement of the mark is processed prior to the interpolating by:
   passing the output signal of the detecting step as a first input to a phase error detector of a phase locked loop and passing as a second input to the phase error detector the output or divided output of a voltage controlled oscillator of the phase locked loop; and,
   using the output of the voltage controlled oscillator as the output signal that is used in the interpolating step.

17. A method according to claim 16, comprising:
   passing the output signal of the detecting step as a first input to a frequency discriminator;
   passing as a second input to the frequency discriminator the output or divided output of the voltage controlled oscillator of the phase locked loop;
   selectively applying the outputs of the frequency discriminator to the inputs of an operational amplifier of the phase locked loop so as to inject current pulses into the operational amplifier to indicate the direction of change of frequency required of the voltage controlled oscillator.

18. A method according to claim 16, wherein the output from the voltage controlled oscillator is passed to a sine function look-up table and to a cosine function look-up table, the outputs of the sine function look-up table and the cosine function look-up table providing a two-component output signal in which the two components are exactly or substantially 90° apart in phase.

19. A method according to claim 1, wherein the at least one mark is detected optically.

20. A method according to claim 1, wherein the interpolation is carried out by at least two interpolators that operate on an interleaved basis such that as one of the interpolators is carrying out interpolation, the or another of the interpolators can update and settle.

21. A method of writing servo tracks to a magnetic disk using a servo pattern signal, the phase of the servo pattern signal being adjusted relative to a clock signal generated in accordance with claim 1 so that the servo pattern signal is in phase with the clock signal.

22. A method of characterising timing errors in a servo track writer in which, during a servo track writing process, a storage medium rotates at a rotational frequency which is obtained from a reference signal having a reference frequency; a servo pattern signal having a pattern frequency is obtained from said reference signal; the phase of the servo pattern signal is adjusted relative to a clock signal so that the servo pattern signal is in phase with the clock signal; and, a servo track in accordance with the servo pattern signal is written to the storage medium; the method comprising:
   recording at least some of the phase adjustments made to the servo pattern signal either i) prior to a servo track writing process, or ii) during a servo track writing process, or iii) prior to and during a servo track writing process; and,
   determining timing errors arising in the servo track writer from said recorded phase adjustments either i) prior to the servo track writing process, or ii) during the servo track writing process, or iii) prior to and during the servo track writing process.

23. A method according to claim 22, wherein the servo pattern signal is obtained by passing the reference signal to two amplifiers the outputs of which are separated or shifted in phase relative to each other and summing said outputs, the phase of said servo pattern signal being adjusted by adjusting the gain of at least one of the amplifiers.

24. Apparatus for generating a clock signal from a moving medium, the apparatus comprising:
   a detector for detecting movement of at least one mark that moves synchronously with the medium to allow a generally sinusoidal output signal corresponding to movement of the mark to be produced; and,
   an interpolator for interpolating said generally sinusoidal output signal by dynamically adjusting the phase of said generally sinusoidal output signal using a phase angle that is controllably varied to provide a clock signal having a higher frequency than said generally sinusoidal output signal,
   wherein the interpolator is arranged to dynamically adjust the phase of the interpolated output clock signal to correct for errors in the phase of said output signal by adjusting said phase angle.

25. Apparatus according to claim 24, wherein the arrangement is such that the interpolator dynamically adjusts the phase of the interpolated output clock signal by detecting phase errors in the interpolated output clock signal and feeding back corrections into the interpolation step.

26. Apparatus according to claim 24, wherein the arrangement is such that the output signal comprises two components that are out of phase with each other, the interpolator being arranged to multiply said components by variable amplitudes and to sum the amplitude-multiplied components.

27. Apparatus according to claim 26, wherein the arrangement is such that the variable amplitudes are varied at least to compensate for one or more non-repeatable timing errors that have previously been identified.

28. Apparatus according to claim 26, wherein the detector is arranged to output two analogue signals which are used as or to form said two components of the output signal.

29. Apparatus according to claim 26, wherein the detector is arranged to output a single signal that is used to form said two components of the output signal.

30. Apparatus according to claim 26, wherein said two components of the output signal are exactly or substantially 90° apart in phase, the apparatus being constructed and arranged to multiply one of the components by $\sin(P_1)$ and the other of the components by $\cos(P_2)$ where $P_1$ and $P_2$ are variable phase angles that are varied at least according to the frequency required of the clock signal.

31. Apparatus according to claim 30, wherein the apparatus is constructed and arranged to vary $P_1$ and $P_2$ to correct for errors in the phase of said output signal.

32. Apparatus according to claim 31, comprising:
   a source of a reference signal having a reference frequency;
   a motor for rotating a said medium at a rotational frequency which is obtained from the reference signal;
   a servo pattern signal generator for generating a servo pattern signal having a pattern frequency which is obtained from said reference signal;
   a phase adjuster for adjusting the phase of the servo pattern signal relative to the clock signal so that the servo pattern signal is in phase with the clock signal;
   a write head for writing a servo track to a said medium in accordance with the servo pattern signal; and,
   a phase setter for monitoring the phase adjustments made to the servo pattern signal and for setting values for $P_1$ and $P_2$ in accordance with the monitored phase adjustments made to the servo pattern signal.

33. Apparatus according to claim 24, comprising:
   a source of a reference signal having a reference frequency;
   a motor for rotating a said medium at a rotational frequency which is obtained from the reference signal;
   a servo pattern signal generator for generating a servo pattern signal having a pattern frequency which is obtained from said reference signal;
   a phase adjuster for adjusting the phase of the servo pattern signal relative to the clock signal so that the servo pattern signal is in phase with the clock signal;
   a write head for writing a servo track to a said medium in accordance with the servo pattern signal; and,
   a phase setter for monitoring the phase adjustments made to the servo pattern signal and for adjusting the phase of the generated clock signal in accordance with the phase adjustments made to the servo pattern signal thereby to correct for errors in the phase of said output signal.

34. Apparatus according to claim 32, wherein the phase adjuster comprises two amplifiers, a phase separator or shifter for separating or shifting the outputs of the amplifiers in phase relative to each other, a summer for summing said phase separated outputs, and a gain controller for adjusting the gain of at least one of the amplifiers thereby to adjust the phase of said servo pattern signal.

35. Apparatus according to claim 31, comprising:
a phase locked loop which is arranged to receive the signal generated by the interpolator, the phase locked loop having a phase error detector the output of which is used to provide a control signal to a voltage controlled oscillator of the phase locked loop; and,
a phase setter for monitoring variations in the control signal provided to said voltage controlled oscillator and for setting values for $P_1$ and $P_2$ in accordance with the monitored variations.

36. Apparatus according to claim 24, comprising:
a phase locked loop which is arranged to receive the signal generated by the interpolator, the phase locked loop having a phase error detector the output of which is used to provide a control signal to a voltage controlled oscillator of the phase locked loop; and,
a phase setter for monitoring variations in the control signal provided to said voltage controlled oscillator and for adjusting the phase of the generated clock signal in accordance with the variations in the control signal provided to said voltage controlled oscillator thereby to correct for errors in the phase of said output signal.

37. Apparatus according to claim 36, comprising an equalisation filter constructed and arranged to apply a selective phase delay to repeatable timing error data obtained from said phase setter, thereby to correct for errors that can arise through operation of said phase locked loop.

38. Apparatus according to claim 24, comprising:
a phase locked loop, the phase locked loop having a phase error detector that is arranged to receive an output from the detector as a first input and the output or divided output of a voltage controlled oscillator of the phase locked loop as a second input, the output of the voltage controlled oscillator being used as the output signal provided to the interpolator.

39. Apparatus according to claim 38, comprising:
a frequency discriminator that is arranged to receive an output signal of the detector as a first input and the output or divided output of the voltage controlled oscillator of the phase locked loop as a second input;
the phase locked loop having an operational amplifier that is arranged to selectively receive the outputs of the frequency discriminator as inputs so that current pulses are injected into the operational amplifier to indicate the direction of change of frequency required of the voltage controlled oscillator.

40. Apparatus according to claim 38, comprising a sine function look-up table and a cosine function look-up table that are each arranged to receive the output from the voltage controlled oscillator, whereby the outputs of the sine function look-up table and the cosine function look-up table provide a two-component output signal in which the two components are exactly or substantially 90° apart in phase.

41. Apparatus according to claim 24, wherein the detector is arranged to detect the at least one mark optically.

42. Apparatus according to claim 24, comprising at least two interpolators for interpolating said generally sinusoidal output signal to provide a clock signal, the at least two interpolators being constructed and arranged to operate on an interleaved basis such that as one of the interpolators is carrying out interpolation, the or another of the interpolators can update and settle.

43. A servo track writer for writing servo tracks to a magnetic disk using a servo pattern signal, the servo track writer comprising:
apparatus according to claim 24 for generating a clock signal from a moving medium;
a servo pattern signal generator for generating a said servo pattern signal; and,
a phase adjuster for adjusting the phase of a said servo pattern signal relative to a said clock signal so that the servo pattern signal is in phase with the clock signal.

44. Apparatus for characterising timing errors in a servo track writer in which, during a servo track writing process, a storage medium rotates at a rotational frequency which is obtained from a reference signal having a reference frequency; a servo pattern signal having a pattern frequency is obtained from said reference signal; the phase of the servo pattern signal is adjusted relative to a clock signal so that the servo pattern signal is in phase with the clock signal; and, a servo track in accordance with the servo pattern signal is written to the storage medium; the apparatus comprising:
a data recorder for recording at least some of the phase adjustments made to the servo pattern signal either i) prior to a servo track writing process, or ii) during a servo track writing process, or iii) prior to and during a servo track writing process; and,
a processor for determining timing errors arising in the servo track writer from said recorded phase adjustments either i) prior to the servo track writing process, ii) during the servo track writing process, or iii) prior to and during the servo track writing process.

45. Apparatus according to claim 44, comprising a phase adjuster for adjusting the phase of the servo pattern signal relative to a clock signal so that the servo pattern signal is in phase with the clock signal, the phase adjuster comprising two amplifiers, a phase separator or shifter for separating or shifting the outputs of the amplifiers in phase relative to each other, a summer for summing said phase separated outputs, and a gain controller for adjusting the gain of at least one of the amplifiers thereby to adjust the phase of said servo pattern signal.

* * * * *